United States Patent
Umeda et al.

(10) Patent No.: US 7,435,489 B2
(45) Date of Patent: Oct. 14, 2008

(54) MAGNETIC RECORDING MEDIUM, MAGNETIC STORAGE APPARATUS AND RECORDING METHOD

(75) Inventors: Hisashi Umeda, Higashine (JP); Iwao Okamoto, Higashine (JP)

(73) Assignee: Fujitsu Limited, Kawasaki (JP)

(*) Notice: Subject to any disclaimer, the term of this patent is extended or adjusted under 35 U.S.C. 154(b) by 171 days.

(21) Appl. No.: 10/798,102

(22) Filed: Mar. 11, 2004

(65) Prior Publication Data

US 2005/0014028 A1    Jan. 20, 2005

(30) Foreign Application Priority Data

Jul. 14, 2003    (JP) .............................. 2003-196583

(51) Int. Cl.
G11B 5/66    (2006.01)

(52) U.S. Cl. ...................................... 428/829

(58) Field of Classification Search .................. 428/829
See application file for complete search history.

(56) References Cited

U.S. PATENT DOCUMENTS

| 6,280,813 | B1  | 8/2001  | Carey et al. ................ 428/65.3 |
| 6,537,684 | B1  | 3/2003  | Doerner et al. |
| 6,567,236 | B1  | 5/2003  | Doerner et al. |
| 6,635,367 | B2  | 10/2003 | Igarashi et al. |
| 6,645,646 | B1  | 11/2003 | Umeda et al. |
| 6,773,833 | B2  | 8/2004  | Inomata et al. |
| 6,815,082 | B2* | 11/2004 | Girt ........................ 428/828.1 |
| 6,881,496 | B2  | 4/2005  | Okamoto |
| 6,899,959 | B2  | 5/2005  | Bertero et al. |
| 2002/0039668 | A1 | 4/2002 | Inomata et al. |
| 2002/0064689 | A1 | 5/2002 | Yamanaka et al. |
| 2003/0017369 | A1 | 1/2003 | Hirayama et al. |
| 2003/0059648 | A1 | 3/2003 | Akimoto et al. |
| 2003/0104253 | A1 | 6/2003 | Osawa et al. |
| 2003/0108774 | A1 | 6/2003 | Kawai et al. |

FOREIGN PATENT DOCUMENTS

| EP | 1 059 629 | 12/2000 |
| EP | 1 298 648 | 4/2003 |
| EP | 1 302 931 | 4/2003 |
| EP | 1 343 147 | 9/2003 |
| JP | 2001-056921 | 2/2001 |
| JP | 2001-056924 | 2/2001 |
| JP | 2002-109713 | 4/2002 |
| JP | 2002-279618 | 9/2002 |
| JP | 2002-352407 | 12/2002 |
| JP | 2003-016624 | 1/2003 |
| JP | 2003-0999911 | 4/2003 |
| JP | 2003-263714 | 9/2003 |
| JP | 2003-263715 | 9/2003 |

* cited by examiner

*Primary Examiner*—Holly Rickman
(74) *Attorney, Agent, or Firm*—Greer, Burns & Crain, Ltd.

(57) ABSTRACT

A magnetic recording medium is provided with an exchange layer structure, and a magnetic layer provided on the exchange layer structure. The exchange layer structure includes a ferromagnetic layer and a nonmagnetic coupling layer provided on the ferromagnetic layer, where the ferromagnetic layer and the magnetic layer are exchange-coupled and having mutually antiparallel magnetizations. The ferromagnetic layer and the magnetic layer satisfy a relationship $Hc1' \geq Hc2'$, where $Hc1'$ denotes a dynamic coercivity of the ferromagnetic layer and $Hc2'$ denotes a dynamic coercivity of the magnetic layer.

21 Claims, 17 Drawing Sheets

FIG.18

| | FERROMAGNETIC LAYER Pt CONTENT (ATOMIC %) | MAGNETIC LAYER Pt CONTENT (ATOMIC%) | MAGNETIC LAYER DYNAMIC COERCIVITY (kA/m) | S/Nt DETERIORATION (dB/decade) |
|---|---|---|---|---|
| DISK D1 | 16 | 12 | 627.6 | -0.020 |
| DISK D2 | 0 | 12 | 573.6 | -0.107 |
| DISK D3 | 7.5 | 12 | 651.2 | -0.084 |

MAGNETIC RECORDING MEDIUM, MAGNETIC STORAGE APPARATUS AND RECORDING METHOD

BACKGROUND OF THE INVENTION

This application claims the benefit of a Japanese Patent Application No. 2003-196583 filed Jul. 14, 2003, in the Japanese Patent Office, the disclosure of which is hereby incorporated by reference.

1. Field of the Invention

The present invention generally relates to magnetic recording media, magnetic storage apparatuses and recording methods, and more particularly to a magnetic recording medium which is suited for making a high-density recording, a magnetic storage apparatus which employs such a magnetic recording medium, and a recording method for recording information on such a magnetic recording medium.

2. Description of the Related Art

Recently, the recording densities of magnetic recording media have increased rapidly, even at a rate reaching 100% per year. However, in the popularly employed longitudinal (or in-plane) recording system, it is expected that a limit of the longitudinal recording density will be on the order of 100 Gb/in$^2$, because of problems associated with thermal stability of the magnetic recording medium. In order to reduce the medium noise in the high-density recording region, the size of crystal grain forming the magnetization unit is reduced, so as to reduce the zigzag of the boundary between the magnetization units, that is, the magnetization transition region. However, when the size of the crystal grain is reduced, the volume forming the magnetization unit decreases, to thereby cause the magnetization to decrease due to thermal instability. Accordingly, in order to achieve a high recording density exceeding 100 Gb/in$^2$, it is necessary to simultaneously reduce the medium noise and improve the thermal stability.

Magnetic recording media which simultaneously reduce the medium noise and improve the thermal stability have been proposed in Japanese Laid-Open Patent Applications No. 2001-056921 and No. 2001-056924, for example. The proposed magnetic recording medium includes an exchange layer structure and a magnetic layer provided on the exchanged layer structure, where the exchange layer structure is made up of a nonmagnetic coupling layer and a ferromagnetic layer provided on the nonmagnetic coupling layer. The ferromagnetic layer and the magnetic layer are exchange-coupled anti-ferromagnetically via the nonmagnetic coupling layer. The effective crystal grain volume becomes the sum of crystal grain volumes of the ferromagnetic layer and the magnetic layer which are exchange-coupled. Consequently, the thermal stability is greatly improved, and the medium noise can be reduced because the crystal grain size can further be reduced. By using the proposed magnetic recording medium, the thermal stability of the recorded (written) bits improve, and the medium noise is reduced, thereby enabling a highly reliable high-density recording.

In the proposed magnetic recording medium, the reproduced output is approximately proportional to a difference between the remanent magnetizations of the magnetic layer and the ferromagnetic layer, because the magnetization directions of the magnetic layer and the ferromagnetic layer are mutually antiparallel. Hence, in order to obtain a reproduced output comparable to that obtained by the conventional magnetic recording medium having the magnetic layer with the single-layer structure, the magnetic layer closer to a recording and/or reproducing magnetic head is set thicker than the ferromagnetic layer which is further away from the magnetic head, and also thicker than the conventional magnetic layer having the single-layer structure, if materials having the same composition are used for the magnetic layer and the ferromagnetic layer. However, when the proposed magnetic recording medium has the magnetic layer with such a thickness, there is a possibility of deteriorating the write performances, such as the overwrite performance and the Non-Linear-Transition-Shift (NLTS) performance, due to the increased thickness of the magnetic layer.

On the other hand, when a recording magnetic field is applied to the proposed magnetic recording medium from the magnetic head at the time of the recording, the magnetization directions of the magnetic layer and the ferromagnetic layer align in the direction of the recording magnetic field and become mutually parallel. Thereafter, when the magnetic head moves and the recording magnetic field weakens, the magnetization direction of the ferromagnetic layer switches in response to an exchange field of the magnetic layer and the magnetization directions of the ferromagnetic layer and the magnetic layer become mutually antiparallel. However, in a vicinity of a magnetic pole of the magnetic head at a trailing edge along the moving direction of the magnetic head, the behaviors of the magnetic layer and the ferromagnetic layer, such as the switching of the magnetization directions, immediately after switching the direction of the recording magnetic field, become complex due to the exchange field and the demagnetization field of each of the magnetic layer and the ferromagnetic layer. With respect to the magnetic layer, the position, inclination and the like of the magnetization transition region may change and the NLTS performance may deteriorate, particularly due to the magnetic characteristics and the like of the ferromagnetic layer.

SUMMARY OF THE INVENTION

Accordingly, it is a general object of the present invention to provide a novel and useful magnetic recording medium, magnetic storage apparatus and recording method, in which the problems described above are eliminated.

Another and more specific object of the present invention is to provide a magnetic recording medium, a magnetic storage apparatus and a recording method, which can realize improved thermal stability of written bits, reduce the medium noise, and improve the write performances.

Still another object of the present invention is to provide a magnetic recording medium comprising an exchange layer structure; and a magnetic layer provided on the exchange layer structure, the exchange layer structure comprising a ferromagnetic layer and a nonmagnetic coupling layer provided on the ferromagnetic layer, the ferromagnetic layer and the magnetic layer being exchange-coupled and having mutually antiparallel magnetizations, the ferromagnetic layer and the magnetic layer satisfying a relationship $Hc1' \geq Hc2'$, where $Hc1'$ denotes a dynamic coercivity of the ferromagnetic layer and $Hc2$ denotes a dynamic coercivity of the magnetic layer. According to the magnetic recording medium of the present invention, the magnetization direction of the magnetic layer switches in the direction of the recording magnetic field before the magnetization direction of the ferromagnetic layer. For this reason, the magnetization transition region of the magnetic layer is formed at a position corresponding to the switching timing of the recording magnetic field, and the NLTS performance is improved. Further, since the ferromagnetic layer applies an exchange field in the same direction as the recording magnetic field to the magnetic layer, the magnetization direction of the magnetic layer is more easily switched, thereby improving the overwrite performance.

A further object of the present invention is to provide a magnetic recording medium comprising an exchange layer structure; and a magnetic layer provided on the exchange layer structure, the exchange layer structure comprising a ferromagnetic layer and a nonmagnetic coupling layer provided on the ferromagnetic layer, the ferromagnetic layer and the magnetic layer being exchange-coupled and having mutually antiparallel magnetizations, each of the ferromagnetic layer and the magnetic layer being made of an alloy having CoCrPt as a main component such that a Pt content of the magnetic layer in atomic % is less than or equal to a Pt content of the ferromagnetic layer in atomic %. According to the magnetic recording medium of the present invention, it is possible to improve the NLTS performance and the overwrite performance by setting the ferromagnetic layer and the magnetic layer to satisfy a relationship $Hc1' \geqq Hc2'$, where $Hc1'$ denotes a dynamic coercivity of the ferromagnetic layer and $Hc2'$ denotes a dynamic coercivity of the magnetic layer.

Another object of the present invention is to provide a magnetic recording medium comprising a first exchange layer structure; a second exchange layer structure provided on the first exchange layer structure; and a magnetic layer provided on the second exchange layer structure, the first exchange layer structure comprising a first ferromagnetic layer and a first nonmagnetic coupling layer provided on the first ferromagnetic layer, the second exchange layer structure comprising a second ferromagnetic layer and a second nonmagnetic coupling layer provided on the second ferromagnetic layer, the first and second ferromagnetic layers being exchange-coupled and having mutually antiparallel magnetizations, the second ferromagnetic layer and the magnetic layer being exchange-coupled and having mutually antiparallel magnetizations, the first and second ferromagnetic layers and the magnetic layer satisfying a relationship $Hc1' \geqq Hc2'$ and $Hc3' \leqq Hc2'$, where $Hc3'$ denotes a dynamic coercivity of the first ferromagnetic layer, $Hc1'$ denotes a dynamic coercivity of the second ferromagnetic layer, and $Hc2'$ denotes a dynamic coercivity of the magnetic layer. According to the magnetic recording medium of the present invention, the magnetization direction of the first ferromagnetic layer is switched first when the direction of the recording magnetic field is switched, and the magnetization direction of the magnetic layer switches in the direction of the recording magnetic field approximately at the same time. Hence, the magnetization transition region of the magnetic layer is formed at a position corresponding to the switching timing of the recording magnetic field. Since the first ferromagnetic layer applies an exchange field in an opposite direction to the direction of the recording magnetic field to the second ferromagnetic layer when the magnetization direction of the magnetic layer switches, the magnetization direction of the second ferromagnetic layer uneasily switches in the direction of the recording magnetic field and maintains the magnetization direction before the recording magnetic field was switched. Therefore, the second ferromagnetic layer applies an exchange field in the same direction as the recording magnetic field to the magnetic layer, so that the magnetization direction of the magnetic layer more easily switches, and the NLTS performance and the overwrite performance are improved thereby.

Still another object of the present invention is to provide a magnetic recording medium comprising an exchange layer structure; and a magnetic layer provided on the exchange layer structure, the exchange layer structure comprising a ferromagnetic layer and a nonmagnetic coupling layer provided on the ferromagnetic layer, the ferromagnetic layer and the magnetic layer being exchange-coupled and having mutually antiparallel magnetizations, a magnetization direction of the magnetic layer switching before a magnetization direction of the ferromagnetic layer in response to a recording magnetic field which is applied to the magnetic layer and the ferromagnetic layer to switch the magnetization directions thereof. According to the magnetic recording medium of the present invention, the magnetization direction of the magnetic layer switches first in the direction of the recording magnetic field when the direction of the recording magnetic field is switched. Thus, the magnetization transition region of the magnetic layer is formed at a position corresponding to the switching timing of the recording magnetic field. As a result, the NLTS performance and the overwrite performance are improved.

A further object of the present invention is to provide a magnetic storage apparatus comprising at least one magnetic recording medium having an exchange layer structure and a magnetic layer provided on the exchange layer structure; and a head to record information on and/or reproduce information from the magnetic recording medium, wherein exchange layer structure comprises a ferromagnetic layer and a nonmagnetic coupling layer provided on the ferromagnetic layer, the ferromagnetic layer and the magnetic layer are exchange-coupled and have mutually antiparallel magnetizations, and the ferromagnetic layer and the magnetic layer satisfy a relationship $Hc1' \geqq Hc2'$, where $Hc1'$ denotes a dynamic coercivity of the ferromagnetic layer and $Hc2'$ denotes a dynamic coercivity of the magnetic layer. According to the magnetic storage apparatus of the present invention, the magnetization direction of the magnetic layer switches in the direction of the recording magnetic field before the magnetization direction of the ferromagnetic layer. For this reason, the magnetization transition region of the magnetic layer is formed at a position corresponding to the switching timing of the recording magnetic field, and the NLTS performance is improved. Further, since the ferromagnetic layer applies an exchange field in the same direction as the recording magnetic field to the magnetic layer, the magnetization direction of the magnetic layer is more easily switched, thereby improving the overwrite performance.

Another object of the present invention is to provide a magnetic storage apparatus comprising at least one magnetic recording medium having an exchange layer structure and a magnetic layer provided on the exchange layer structure; and a head to record information on and/or reproduce information from the magnetic recording medium, wherein the exchange layer structure comprises a ferromagnetic layer and a nonmagnetic coupling layer provided on the ferromagnetic layer, the ferromagnetic layer and the magnetic layer are exchange-coupled and have mutually antiparallel magnetizations, and each of the ferromagnetic layer and the magnetic layer is made of an alloy having CoCrPt as a main component such that a Pt content of the magnetic layer in atomic % is less than or equal to a Pt content of the ferromagnetic layer in atomic %. According to the magnetic storage apparatus of the present invention, it is possible to improve the NLTS performance and the overwrite performance by setting the ferromagnetic layer and the magnetic layer to satisfy a relationship $Hc1' \geqq Hc2'$, where $Hc1'$ denotes a dynamic coercivity of the ferromagnetic layer and $Hc2'$ denotes a dynamic coercivity of the magnetic layer.

Still another object of the present invention is to provide a magnetic storage apparatus comprising at least one magnetic recording medium having a first exchange layer structure, a second exchange layer structure provided on the first exchange layer structure, and a magnetic layer provided on the second exchange layer structure; and a head to record information on and/or reproduce information from the magnetic recording medium, wherein the first exchange layer structure comprises a first ferromagnetic layer and a first nonmagnetic coupling layer provided on the first ferromagnetic layer, the second exchange layer structure comprises a second ferromagnetic layer and a second nonmagnetic coupling layer provided on the second ferromagnetic layer, the first and second ferromagnetic layers are exchange-coupled and have mutually antiparallel magnetizations, the second ferromagnetic layer and the magnetic layer are exchange-coupled and have mutually antiparallel magnetizations, and the first and second ferromagnetic layers and the magnetic layer satisfy a relationship $Hc1' \geqq Hc2'$ and $Hc3' \leqq Hc2'$, where $Hc3'$ denotes a dynamic coercivity of the first ferromagnetic layer, $Hc1'$ denotes a dynamic coercivity of the second ferromagnetic layer, and $Hc2'$ denotes a dynamic coercivity of the magnetic layer. According to the magnetic storage apparatus of the present invention, the magnetization direction of the first ferromagnetic layer is switched first when the direction of the recording magnetic field is switched, and the magnetization direction of the magnetic layer switches in the direction of the recording magnetic field approximately at the same time. Hence, the magnetization transition region of the magnetic layer is formed at a position corresponding to the switching timing of the recording magnetic field. Since the first ferromagnetic layer applies an exchange field in an opposite direction to the direction of the recording magnetic field to the second ferromagnetic layer when the magnetization direction of the magnetic layer switches, the magnetization direction of the second ferromagnetic layer uneasily switches in the direction of the recording magnetic field and maintains the magnetization direction before the recording magnetic field was switched. Therefore, the second ferromagnetic layer applies an exchange field in the same direction as the recording magnetic field to the magnetic layer, so that the magnetization direction of the magnetic layer more easily switches, and the NLTS performance and the overwrite performance are improved thereby.

A further object of the present invention is to provide a magnetic storage apparatus comprising at least one magnetic recording medium having an exchange layer structure and a magnetic layer provided on the exchange layer structure; and a head to record information on and/or reproduce information from the magnetic recording medium, wherein the exchange layer structure comprises a ferromagnetic layer and a nonmagnetic coupling layer provided on the ferromagnetic layer, the ferromagnetic layer and the magnetic layer are exchange-coupled and have mutually antiparallel magnetizations, and a magnetization direction of the magnetic layer switches before a magnetization direction of the ferromagnetic layer in response to a recording magnetic field which is applied to the magnetic layer and the ferromagnetic layer to switch the magnetization directions thereof. According to the magnetic storage apparatus of the present invention, the magnetization direction of the magnetic layer switches first in the direction of the recording magnetic field when the direction of the recording magnetic field is switched. Thus, the magnetization transition region of the magnetic layer is formed at a position corresponding to the switching timing of the recording magnetic field. As a result, the NLTS performance and the overwrite performance are improved.

Another object of the present invention is to provide a recording method for magnetically recording information on a magnetic recording medium by applying a recording magnetic field thereon, the magnetic recording medium having an exchange layer structure and a magnetic layer provided on the exchange layer structure, the exchange layer structure comprising a ferromagnetic layer and a nonmagnetic coupling layer provided on the ferromagnetic layer, the ferromagnetic layer and the magnetic layer being exchange-coupled and having mutually antiparallel magnetizations in a state where no recording magnetic field is applied thereon, the method comprising applying a recording magnetic field on the magnetic recording medium so as to satisfy a relationship $Hc1'-HE1 > Hh1$ and $Hc2'-HE2 < Hh2$, where $Hc1'$ denotes a dynamic coercivity of the ferromagnetic layer, $Hc2'$ denotes a dynamic coercivity of the magnetic layer, $HE1$ denotes an exchange field applied to the ferromagnetic layer, $HE2$ denotes an exchange field applied to the magnetic layer, $Hh1$ denotes a recording magnetic field applied on the ferromagnetic layer, and $Hh2$ denotes a recording magnetic field applied on the magnetic layer. According to the recording method of the present invention, the magnetization direction of the magnetic layer switches first in the direction of the recording magnetic field, and the magnetization transition region of the magnetic layer is formed at a position corresponding to the switching timing of the recording magnetic field, to thereby improve the NLTS performance.

Still another object of the present invention is to provide a recording method for magnetically recording information on a magnetic recording medium by applying a recording magnetic field thereon, the magnetic recording medium having an exchange layer structure and a magnetic layer provided on the exchange layer structure, the exchange layer structure comprising a ferromagnetic layer and a nonmagnetic coupling layer provided on the ferromagnetic layer, the ferromagnetic layer and the magnetic layer being exchange-coupled and having mutually antiparallel magnetizations in a state where no recording magnetic field is applied thereon, the method comprising applying a recording magnetic field on the magnetic recording medium so that a magnetization direction of the magnetic layer switches before a magnetization direction of the ferromagnetic layer in response to the recording magnetic field. According to the recording method of the present invention, the magnetization direction of the magnetic layer switches first in the direction of the recording magnetic field when the direction of the recording magnetic field is switched. Thus, the magnetization transition region of the magnetic layer is formed at a position corresponding to the switching timing of the recording magnetic field. As a result, the NLTS performance and the overwrite performance are improved.

Other objects and further features of the present invention will be apparent from the following detailed description when read in conjunction with the accompanying drawings.

BRIEF DESCRIPTION OF THE DRAWINGS

FIG. 18 is a diagram showing characteristics of a dynamic coercivity and a S/Nt change of magnetic recording media;

DESCRIPTION OF THE PREFERRED EMBODIMENTS

Figure 1:
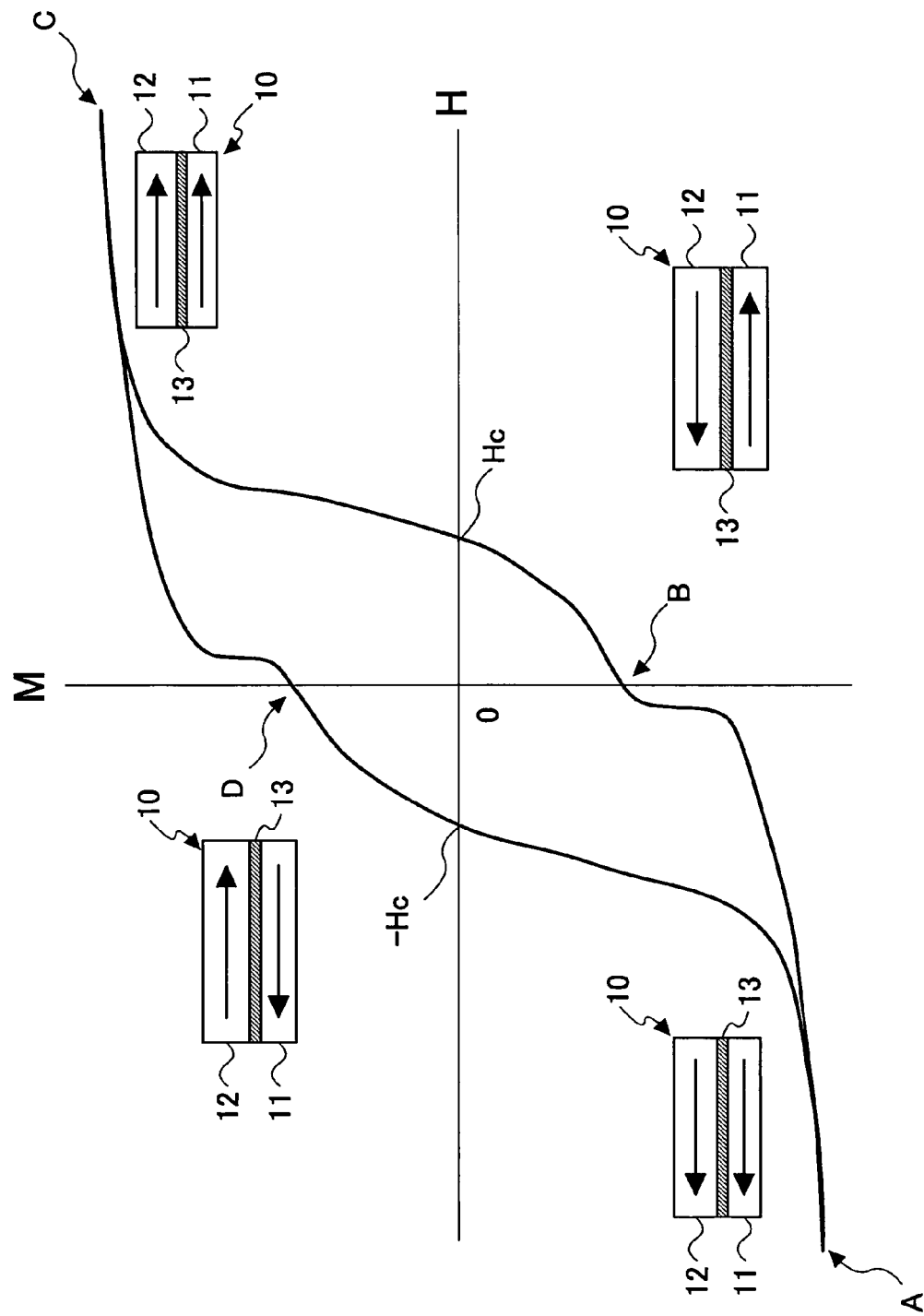
FIG. 1 is a diagram showing static magnetic characteristics and magnetization states of a magnetic recording medium according to the present invention.
Figure 4:
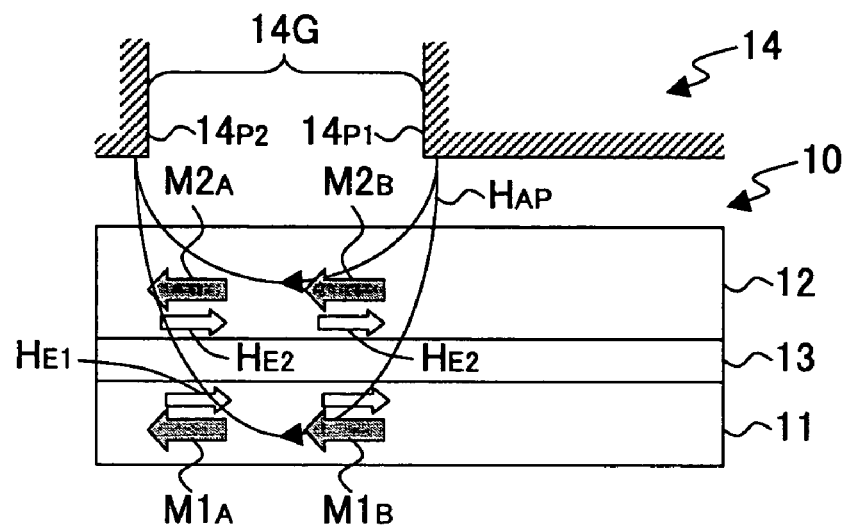
FIG. 4 is a diagram for explaining recording of the magnetic recording medium according to the present invention.

First, a description will be given of the operating principle of the present invention. FIG. 1 is a diagram showing static magnetic characteristics and magnetization states of a magnetic recording medium according to the present invention. In FIG. 1, the ordinate indicates the magnetization M in arbitrary units, and the abscissa indicates the external magnetic field H in arbitrary units. As shown in FIG. 1 and FIG. 4 which will be described later, a magnetic recording medium 10 according to the present invention includes a stacked structure made up of a ferromagnetic layer 11, a nonmagnetic coupling layer 13 and a magnetic layer 12. The ferromagnetic layer 11 disposed closer to a substrate (not shown) than the magnetic layer 12, and the magnetic layer 12 is disposed closer to a magnetic head (not shown) than the ferromagnetic layer 11. The ferromagnetic layer 11 and the magnetic layer 12 are exchange-coupled via the nonmagnetic coupling layer 13. In states B and D where no external magnetic field is applied, the magnetization directions of the ferromagnetic layer 11 and the magnetic layer 12 are mutually antiparallel.

More particularly, when the external magnetic field H is increased from the state B to a state C or, from the state D to a state A in FIG. 1, the magnetization directions of the ferromagnetic layer 11 and the magnetic layer 12 align in the direction of the applied external magnetic field H and become mutually parallel. Next, when the external magnetic field H is decreased, the magnetization direction of the ferromagnetic layer 11 switches due to the exchange field of the magnetic layer 12, and in the state B or D where no external magnetic field is applied, the magnetization directions of the ferromagnetic layer 11 and the magnetic layer 12 become mutually antiparallel. Furthermore, when the external magnetic field H is reversed of its direction and increased, the magnetization M becomes zero, and the value of the external magnetic field H at this zero magnetization M becomes the coercivity Hc. The static magnetic characteristics are measured by a Vibration Sample Magnetometer (VSM) or the like, and the measuring time of one loop is on the order of approximately several minutes. A time required to switch the direction of the external magnetic field H is on the order of approximately several seconds. Such a time required to switch the direction of the external magnetic field H will hereinafter be referred to as a "magnetic field switching time", and the coercivity Hc for a case where the magnetic field switching time is on the order of seconds or greater will hereinafter be referred to as a static coercivity Hc.

On the other hand, the magnetic field switching time at the time of the recording when the magnetic head applies the magnetic field on the magnetic recording medium 10 is on the sub-nano-second to approximately one nano-second order. When switching the magnetic field in such a short magnetic field switching time, a force (for example, a viscous force) acts in a direction interfering with the magnetization motion, and a large magnetic field needs to be applied in order to switch the magnetization direction. In other words, the coercivity Hc increases, and this coercivity Hc which increases in such a manner will be referred to as a dynamic coercivity Hc'.

Figure 2:
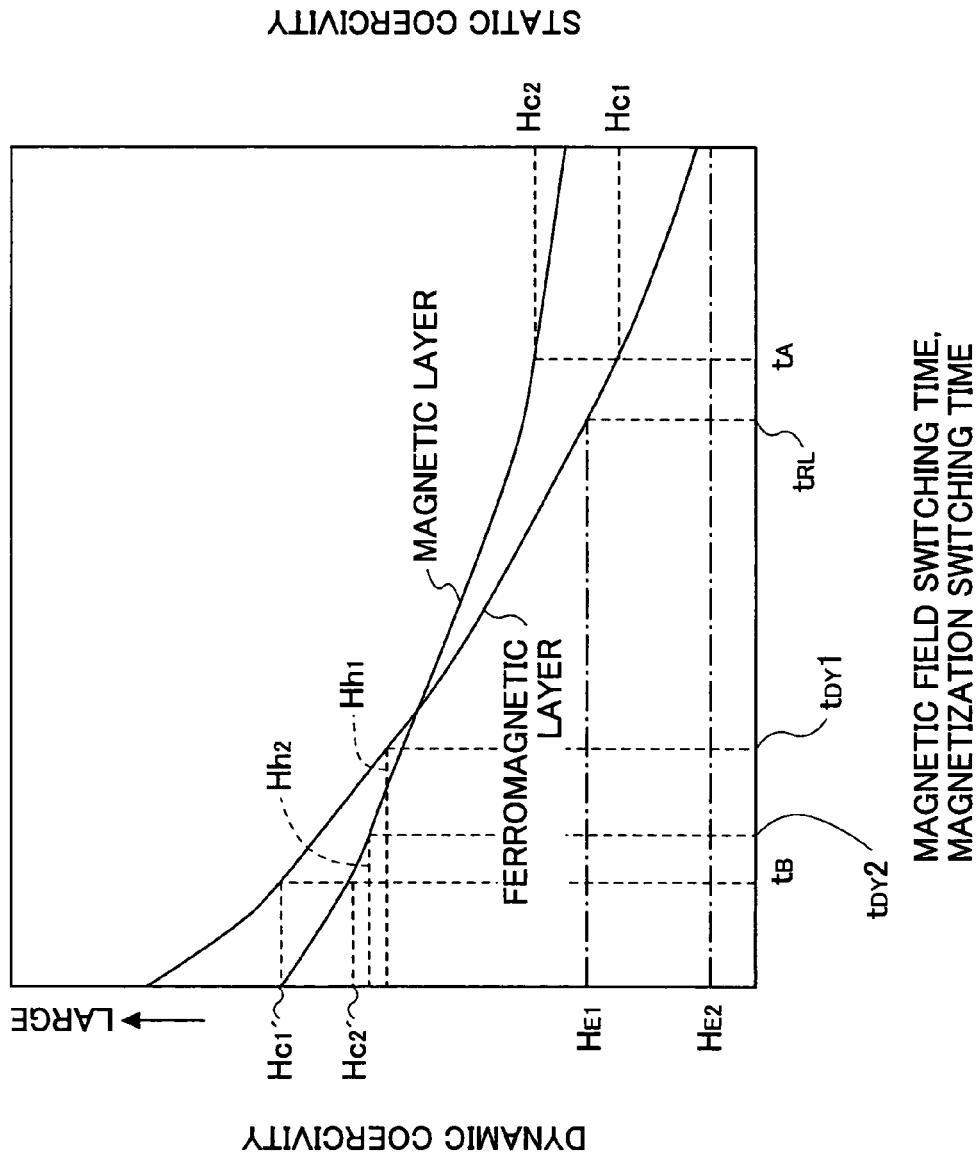
FIG. 2 is a diagram showing a relationship of a dynamic coercivity, a magnetic field and a magnetization switching time of the magnetic recording medium according to the present invention.
Figure 3:
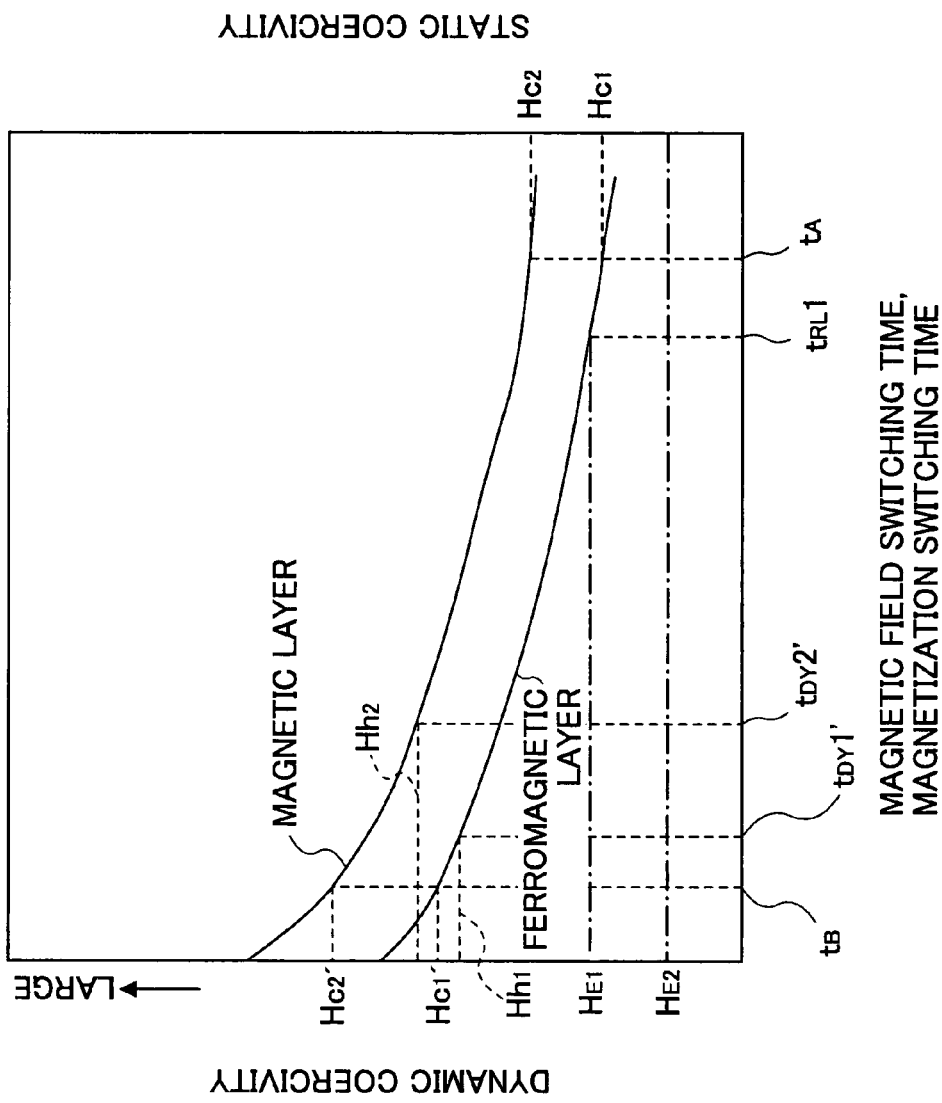
FIG. 3 is a diagram showing a relationship of a dynamic coercivity, a magnetic field and a magnetization switching time of a magnetic recording medium not employing to the present invention.
Figure 9:
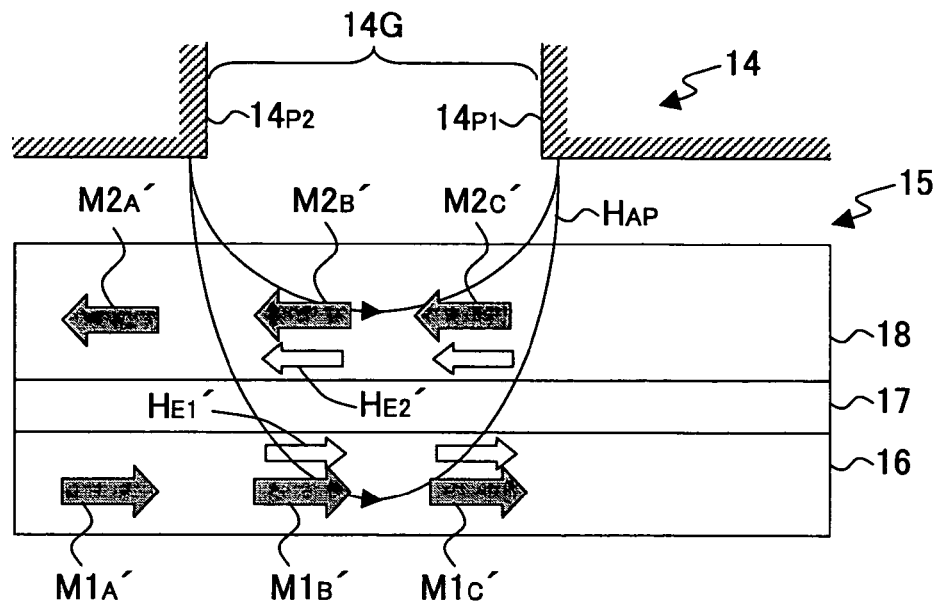
FIG. 9 is a diagram for explaining recording of the magnetic recording medium not employing the present invention.
Figure 10:
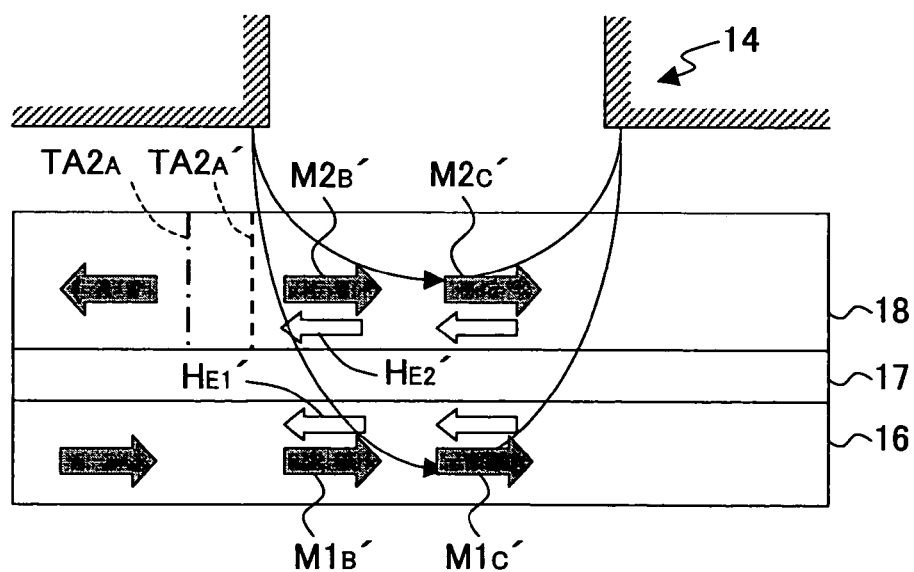
FIG. 10 is a diagram for explaining the recording of the magnetic recording medium not employing the present invention.
Figure 11:
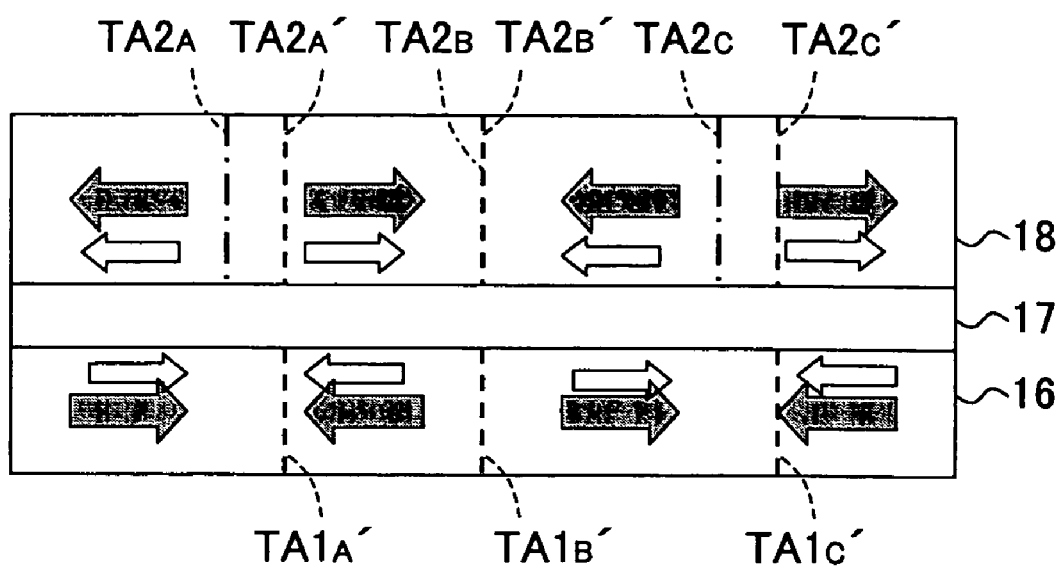
FIG. 11 is a diagram for explaining the recording of the magnetic recording medium not employing the present invention.

FIG. 2 is a diagram showing a relationship of the dynamic coercivity, the magnetic field and a magnetization switching time of the magnetic recording medium 10 according to the present invention. In addition, FIG. 3 is a diagram showing a relationship of the dynamic coercivity, the magnetic field and the magnetization switching time of a magnetic recording medium 15 not employing to the present invention and having a ferromagnetic layer 16, a nonmagnetic coupling layer 17 and a magnetic layer 18 as shown in FIGS. 9 through 11 which will be described later. In FIGS. 2 and 3, the left ordinate indicates the dynamic coercivity in arbitrary units, the right ordinate indicates the static coercivity in arbitrary units, and the abscissa indicates the magnetic field switching time and the magnetization switching time. The magnetization switching time refers to a time required to switch the magnetization direction. FIG. 2 shows the relationship of the recording magnetic field and the exchange field applied to the ferromagnetic layer 11 and the magnetic layer 12 shown in FIG. 1, and FIG. 3 shows the relationship of the recording magnetic field and the exchange field applied to the ferromagnetic layer 16 and the magnetic layer 18 of the magnetic recording medium 15 not employing the present invention.

As shown in FIG. 2, in the magnetic recording medium 10 of the present invention, a static coercivity Hc1 of the ferromagnetic layer 11 and a static coercivity Hc2 of the magnetic layer 12 satisfy a relationship Hc1<Hc2 during a magnetic field switching time tA which is on the order of approximately several seconds. On the other hand, a dynamic coercivity Hc1' of the ferromagnetic layer 11 and a dynamic coercivity Hc2' of the magnetic layer 12 satisfy a relationship Hc1'≧Hc2' during a magnetic field switching time tB at the time of the recording using the recording magnetic field of the magnetic head. The recording magnetic field of the magnetic head depends on the distance from the magnetic head, and a recording magnetic field Hh2 applied to the magnetic layer 12 closer to the magnetic head is larger than a recording magnetic field Hh1 applied to the ferromagnetic layer 11.

Because the magnetic recording medium 10 of the present invention satisfies the relationships described above, the magnetization direction of the magnetic layer 12 having the dynamic coercivity Hc2' less than or equal to the dynamic coercivity Hc1' of the ferromagnetic layer 11 is switched before the magnetization direction of the ferromagnetic layer 11 when the direction of the recording magnetic field of the magnetic head is switched. In other words, a time (magnetization switching time) tDY2 it takes for the magnetization direction of the magnetic layer 12 to switch due to the recording magnetic field Hh2 is shorter than a time (magnetization switching time) tDY1 it takes for the magnetization direction of the ferromagnetic layer 11 to switch due to the recording magnetic field Hh1.

The dynamic coercivity Hc1' of the ferromagnetic layer 11 decreases with lapse of time after the switching of the recording magnetic field. When the dynamic coercivity Hc1' becomes less than or equal to an exchange field HE1 applied to the ferromagnetic layer 11 after a time (ferromagnetic layer magnetization attempt time) tRL elapses from the switching of the recording magnetic field, the magnetization direction of the ferromagnetic layer 11 becomes antiparallel with respect to the magnetization direction of the magnetic layer 12. In other words, the magnetic recording medium 10 attempts to a state having a stable antiferromagnetic coupling, and the thermal stability is improved by the exchange coupling effect of the magnetic layer 12 and the ferromagnetic layer 11.

Furthermore, in the magnetic recording medium 10 of the present invention, the static and dynamic coercivities Hc1 and Hc1' of the ferromagnetic layer 11 and the static and dynamic coercivities Hc2 and Hc2' of the magnetic layer 12 satisfy a relationship (Hc1'/Hc1)>(Hc2'/Hc2).

On the other hand, as shown in FIG. 3, in the magnetic recording medium 15 not using the present invention, the relationship of the static coercivities Hc1 and Hc2 of the ferromagnetic layer 16 and the magnetic layer 18 is the same as that of the magnetic recording medium 10 of the present invention described above in conjunction with FIG. 2. However, the dynamic coercivities Hc1' and Hc2' of the ferromagnetic layer 16 and the magnetic layer 18 during the magnetic field switching time tDY has a relationship Hc1'<Hc2'. In other words, when the direction of the recording magnetic field of the magnetic head is switched, the magnetization direction of the ferromagnetic layer 16 having the dynamic coercivity Hc1' smaller than the dynamic coercivity Hc2' of the magnetic layer 18 is switched before the magnetization direction of the magnetic layer 18. Hence, a time (magnetization switching time) tDY2' it takes for the magnetization direction of the magnetic layer 18 to switch due to the recording magnetic field Hh2 is longer than a time (magnetization switching time) tDY1' it takes for the magnetization direction of the ferromagnetic layer 11 to switch due to the recording magnetic field Hh1. In FIG. 3, a ferromagnetic layer magnetization attempt time is denoted by tRL1.

Next, a description will be given of the functions and effects of the present invention, including the exchange fields acting on the magnetizations of the ferromagnetic layer 11 and the magnetic layer 12, by referring to recording states caused by the magnetic head.

FIGS. 4 through 8 are diagrams for explaining the recording of the magnetic recording medium according to the present invention. FIGS. 4 through 8 show the states of the magnetic recording medium 10 at various points in time when the magnetic recording medium 10 moves towards the left in each of these figures, that is, a magnetic head 14 continuously moves towards the right in each of these figures.

In the state shown in FIG. 4, a recording magnetic field HAP is applied in the left direction from a magnetic pole 14P1 to a magnetic pole 14P2 across a gap 14G, while the magnetic head 14 disposed closer to the magnetic layer 12 of the magnetic recording medium 10 moves from the left to right. The ferromagnetic layer 11 and the magnetic layer 12 are magnetized in the left direction by the recording magnetic field HAP, and the directions of magnetizations M1A and M1B of the ferromagnetic layer 11 are parallel to the directions of magnetizations M2A and M2B of the magnetic layer 12. In addition, due to the exchange coupling of the ferromagnetic layer 11 and the magnetic layer 12, exchange fields HE1 and HE2 are applied in the right direction with respect to the magnetizations M1A, M1B, M2A and M2B of the ferromagnetic layer 11 and the magnetic layer 12.

Figure 5:
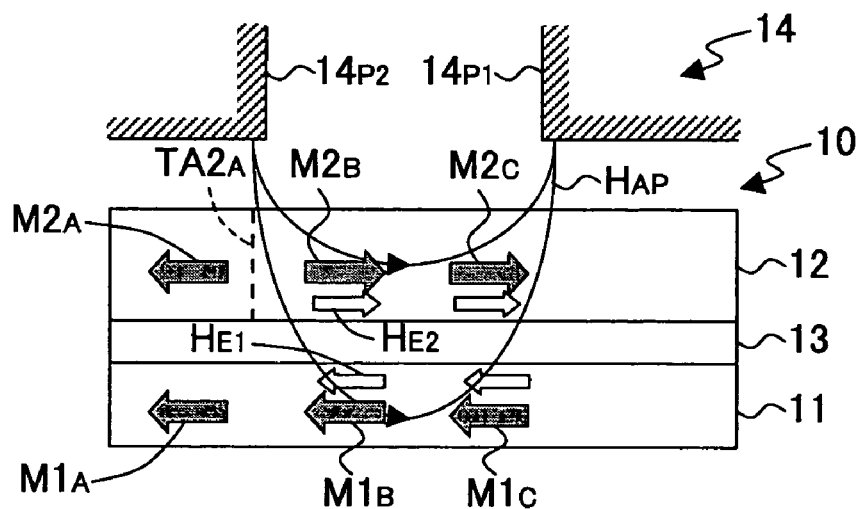
FIG. 5 is a diagram for explaining the recording of the magnetic recording medium according to the present invention.

In the state shown in FIG. 5, the direction of the recording magnetic field HAP is switched when the magnetic head 14 is moved to the right. Since the dynamic coercivities Hc1' and Hc2' of the ferromagnetic layer 11 and the magnetic layer 12 satisfy the relationship Hc1'≧Hc2' in this state as described above, the magnetization M2B of the magnetic layer 12 in a vicinity of the magnetic pole 14P2 at the trailing edge along the moving direction of the magnetic head 14 switches first. In this state, the exchange field HE2 from the ferromagnetic layer 11 acts in the same direction as the recording magnetic field HAP, and a field HAP+HE2 is applied to the magnetization M2B, thereby making it easier for the direction of the magnetization M2B to switch. Accordingly, the direction of the magnetization M2B of the magnetic layer 12 switches without delay from a switching timing of the recording magnetic field HAP, and a magnetization transition region TA2A of the magnetic layer 12 is formed at a position corresponding to the switching timing. As a result, the NLTS performance is improved, and the overwrite performance is improved because it is easier for the direction of the magnetization M2B to switch. Even when Hc1'=Hc2', the recording magnetic field HAP applied to the magnetic layer 12 closed to the magnetic head 14 is larger than that applied to the ferromagnetic layer 11, and the direction of the magnetization M2B of the magnetic layer 12 switches first as described above.

Figure 6:
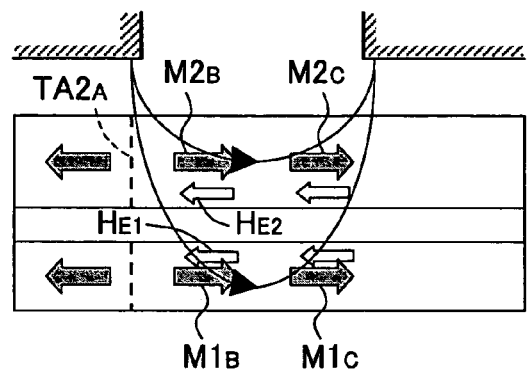
FIG. 6 is a diagram for explaining the recording of the magnetic recording medium according to the present invention.

FIG. 6 shows the state after a slight lapse of time from the state shown in FIG. 5. In the state shown in FIG. 6, the positional relationship of the magnetic recording medium 10 and the magnetic head 14 is virtually unchanged from that of the state shown in FIG. 5, and the direction of the recording magnetic field HAP is the same as that shown in FIG. 5. For this reason, following the switching of the direction of the magnetization M2B of the magnetic layer 12 shown in FIG. 4, the direction of the magnetization M1B of the ferromagnetic layer 11 switches.

Figure 7:
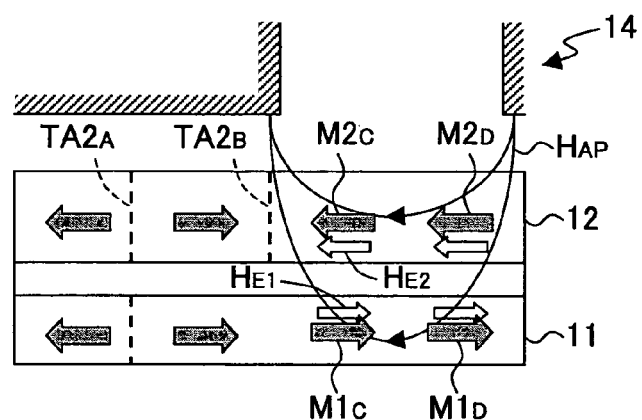
FIG. 7 is a diagram for explaining the recording of the magnetic recording medium according to the present invention.

In the state shown in FIG. 7, the magnetic head 14 has moved more to the right from the state shown in FIG. 6, and the direction of the recording magnetic field HAP is switched. Hence, a phenomenon similar to that described above in conjunction with FIG. 5 occurs. Since the dynamic coercivities Hc1' and Hc2' of the ferromagnetic layer 11 and the magnetic layer 12 satisfy the relationship Hc1'≧Hc2' in this state, the magnetization M2C of the magnetic layer 12 switches first. In this state, the exchange field HE2 from the ferromagnetic layer 11 acts in the same direction as the recording magnetic field HAP, thereby making it easier for the direction of the magnetization M2C to switch. Accordingly, a magnetization transition region TA2 is formed at a position corresponding to the switching timing of the recording magnetic field HAP.

Figure 8:
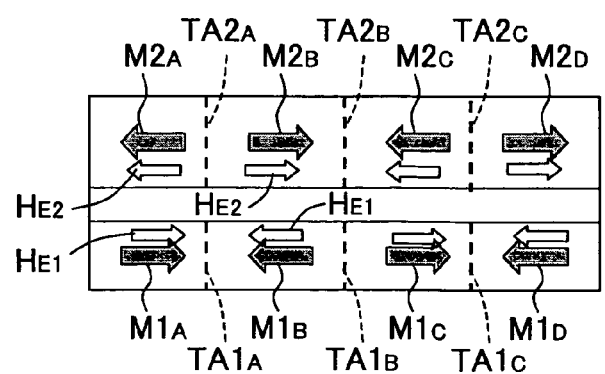
FIG. 8 is a diagram for explaining the recording of the magnetic recording medium according to the present invention.

FIG. 8 shows the state after a time on the order of approximately several milliseconds lapses after the recording described above in conjunction with FIG. 7. Of course, the recording in which the recording magnetic field HAP of the magnetic head 14 is switched is repeated after the state shown in FIG. 7. As shown in FIG. 2, the dynamic coercivity Hc1' of the ferromagnetic layer 11 decreases with the lapse of time after the switching of the recording magnetic field HAP. When the dynamic coercivity Hc1' becomes less than or equal to the exchange field HE1 applied to the ferromagnetic layer 11, the magnetization direction of the ferromagnetic layer 11 becomes antiparallel with respect to the magnetization direction of the magnetic layer 12. In other words, the magnetic recording medium 10 attempts to the state having the stable antiferromagnetic coupling, and magnetization transition regions TA1A through TA1C of the ferromagnetic layer 11 approximately match magnetization transition regions TA2A through TA2C of the magnetic layer 12. Therefore, it is possible to improve the thermal stability by the magnetic coupling effect of the magnetic layer 12 and the ferromagnetic layer 11.

The time (ferromagnetic layer magnetization attempt time) tRL1 shown in FIG. 2 is preferably set in a range of 1 nanosecond to 10 milliseconds. In the case of a magnetic disk apparatus, for example, if the time tRL1 exceeds 10 milliseconds, a leakage magnetic flux from a magnetic disk will be sensed by the magnetic head 14 before the magnetic disk makes one revolution and the magnetization of the ferromagnetic layer 11 attempts, and as a result, the magnetic head 14 will sense a change in the reproduced output caused by the magnetization attempt of the ferromagnetic layer FIGS. 9 through 11 are diagrams for explaining the recording of the magnetic recording medium 15 not employing the present invention. In FIGS. 9 through 11, those parts which are the same as those corresponding parts in FIGS. 4 through 8 are designated by the same reference numerals, and a description thereof will be omitted. The magnetic recording medium 15 not employing the present invention has the ferromagnetic layer 16, the nonmagnetic coupling layer 17 and the magnetic layer 18. In the magnetic recording medium 15, the dynamic coercivity Hc1' of the ferromagnetic layer 16 and the dynamic coercivity Hc2' of the magnetic layer 18 satisfy a relationship Hc1'<Hc2'. Hence, when the recording magnetic field HAP switches, the magnetization direction of the ferromagnetic layer 16 switches before the magnetization direction of the magnetic layer 18.

FIG. 9 shows the state where the magnetic head 14 is moved towards the right from a state similar to that shown in FIG. 4 and the direction of the recording magnetic field HAP is switched. In this case, since the dynamic coercivity Hc1' of the ferromagnetic layer 16 is smaller than the dynamic coercivity Hc2' of the magnetic layer 18, the direction of a magnetization M1B' of the ferromagnetic layer 16 switches first. Since the exchange field HE1 from the magnetic layer 18 is applied to the ferromagnetic layer 16 in the same direction as the recording magnetic field HAP, it is easier for the direction of the magnetization M1B' to switch. Furthermore, although the recording magnetic field HAP weakens in a direction away from the vicinity of the recording gap 14G, the switching of the magnetizations of the ferromagnetic layer 16 extends to a large range approximately up to the position where the recording magnetic field HAP matches the dynamic coercivity Hc1', and the directions of the magnetizations M1A', M1B' and M1C' are switched as shown in FIG. 9, because the dynamic coercivity Hc1' of the ferromagnetic layer 16 is small. However, the exchange field HE2 from the ferromagnetic layer 16, with the switched magnetization direction, is applied to the magnetic layer 18 in the direction opposite to the direction of the recording magnetic field HAP, and the resulting field applied to the magnetic layer 18 decreases. Consequently, it becomes difficult to switch the magnetization direction of the magnetic layer 18. Therefore, the switching of the magnetization direction of the magnetic layer 18 is delayed until the recording magnetic field HAP reaches a magnitude compensating for the exchange field HE2 or, until the dynamic coercivity Hc2' of the magnetic layer 18 decreases and matches the resulting field applied to the magnetic layer 18.

FIG. 10 shows the state where the direction of a magnetization M2B' of the magnetic layer 18 is switched with a delay from the switching timing of the recording magnetic field HAP, and a magnetization transition region TA2A' is formed at a position shifted towards the right from the position corresponding to the switching timing. Accordingly, the magnetization transition region TA2A' is formed at a position shifted towards the right compared to the magnetization transition region TA2A formed in the magnetic recording medium 10 of the present invention.

FIG. 11 shows the state after a time on the order of approximately several milliseconds lapses after the recording described in conjunction with FIG. 10. In the state shown in FIG. 11, magnetization transition regions TA2A' through TA2C' formed in the magnetic layer 18 are shifted from the positions of the magnetization transition regions TA2A through TA2C formed in the magnetic layer 12 of the magnetic recording medium 10 of the present invention. FIG. 11 shows, for comparison purposes, the corresponding positions of the magnetization transition regions TA2A through TA2C of the magnetic recording medium 10 of the present invention in relation to the positions of the magnetization transition regions TA2A' through TA2C' in the magnetic recording medium 15 not employing the present invention. Therefore, the NLTS performance of the magnetic recording medium 15 is deteriorated compared to that of the magnetic recording medium 10 of the present invention. In addition, because it becomes more difficult for the direction of the magnetization M2B' of the magnetic layer 18 to switch, the overwrite performance of the magnetic recording medium 15 also deteriorates. Moreover, since the switching of the magnetization M2B' of the magnetic layer 18 is greatly affected by the magnetic characteristics of the ferromagnetic layer 16, the NLTS performance and the overwrite performance of the magnetic recording medium 15 greatly change depending on inconsistencies and the like of the magnetic characteristics of the ferromagnetic layer 16.

As described above, in the magnetic recording medium 10 of the present invention, the dynamic coercivities Hc1' and Hc2' of the ferromagnetic layer 11 and the magnetic layer 12 satisfy the relationship Hc1'≧Hc2', and the exchange field HE2 of the ferromagnetic layer 11 is applied to the magnetic layer in the same direction as the recording magnetic field HAP. For this reason, the magnetization transition regions TA2A through TA2C of the magnetic layer 12 are formed at the positions corresponding to the switching timing of the recording magnetic field HAP, thereby making it easier for the directions of the magnetizations M2A through M2C of the magnetic layer 12 to switch. Therefore, it is possible to improve the write performances such as the NLTS performance and the overwrite performance.

Next, a description will be given of embodiments of the magnetic recording medium according to the present invention, a magnetic storage apparatus according to the present invention, and a recording method according to the present invention.

First Embodiment

Figure 12:
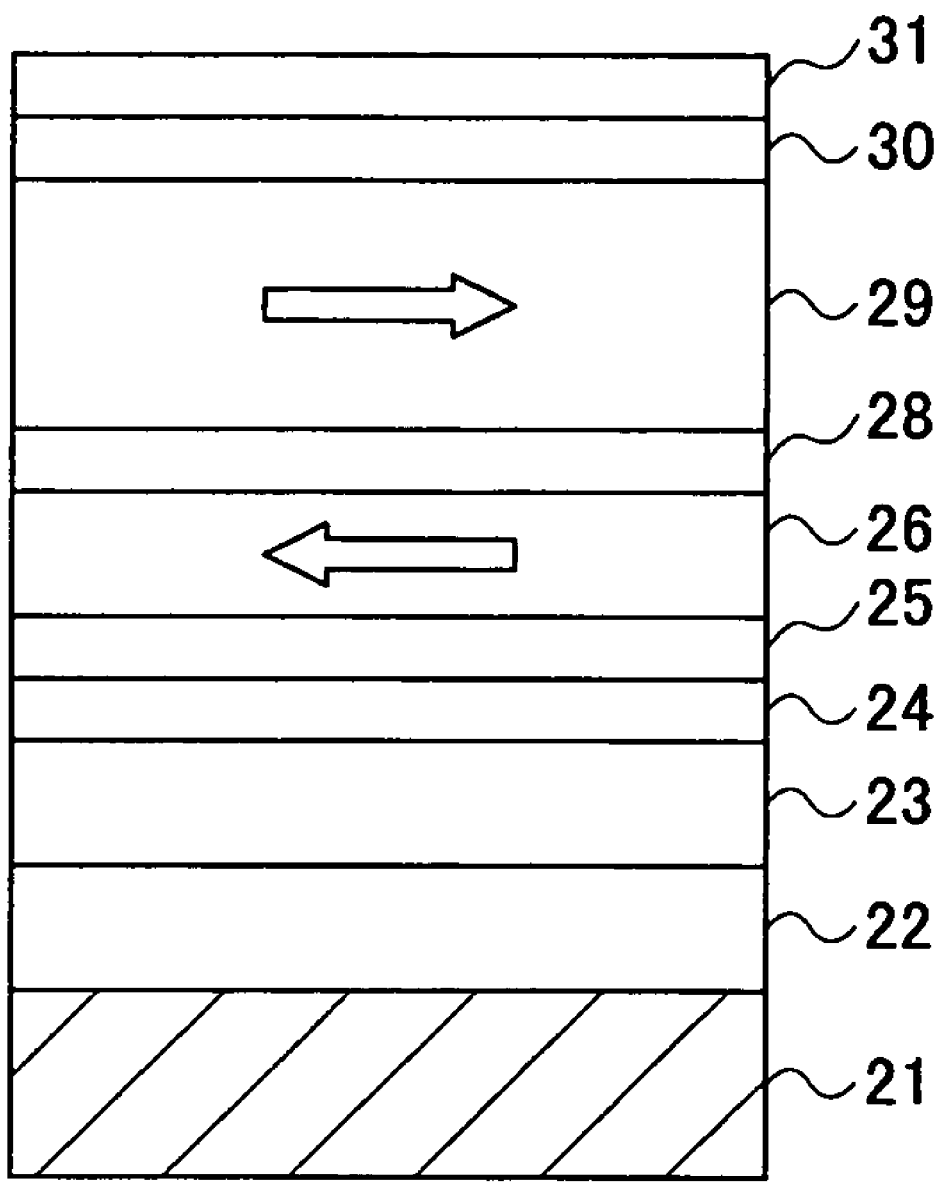
FIG. 12 is a cross sectional view showing an important part of a first embodiment of the magnetic recording medium according to the present invention.

FIG. 12 is a cross sectional view showing an important part of a first embodiment of the magnetic recording medium according to the present invention. As shown in FIG. 12, a magnetic recording medium 20 has a substrate 21 and a stacked structure provided on the substrate 21. The stacked structure includes a first seed layer 22, a second seed layer 23, an underlayer 24, a nonmagnetic intermediate layer 25, a ferromagnetic layer 26, a nonmagnetic coupling layer 28, a magnetic layer 29, a protection layer 30 and a lubricant layer 31 which are successively stacked. The magnetic recording medium 20 is characterized by an exchange-coupled structure in which the ferromagnetic layer 26 and the magnetic layer 29 are antiferromagnetically exchange-coupled via the nonmagnetic coupling layer 28. The magnetic recording medium is further characterized by the relationship Hc1'≧Hc2' between the dynamic coercivity Hc1' of the ferromagnetic layer 26 and the dynamic coercivity Hc2' of the magnetic layer 29.

The substrate 21 may be formed by a disk-shaped plastic substrate, glass substrate, NiP-plated Al alloy substrate, Si substrate and the like, for example. The substrate 21 may also be formed by tape-shaped plastic films made of PET, PEN, polyamide and the like. The substrate 21 may or may not be textured. In a case where the magnetic recording medium 20 is a magnetic disk, a texturing process is carried out in a circumferential direction of the magnetic disk, that is, in a direction in which a track on the magnetic disk extends.

The first seed layer 22 may be made of a nonmagnetic material such as NiP, CoW and CrTi. The first seed layer 22 may or may not be textured. In a case where the first seed layer 22 is made of an amorphous material such as NiP, the first seed layer 22 is preferably oxidized, so that the in-plane orientation of the c-axis improves for the ferromagnetic layer 26 and the magnetic layer 29. Of course, a known material which improves the c-axis orientation may be used for the first seed layer 22 in place of NiP.

The second seed layer 23 may be made of an amorphous material such as NiP, CoW and CrTi, or an alloy having a B2 structure such as AlRu, NiAl and FeAl. In a case where the second seed layer 23 is made of the amorphous material and the underlayer 24 is made of an alloy having the B2 structure, the orientation of the (001) face or (112) face of the underlayer 24 is improved. The second seed layer 23 may or may not be textured. In a case where the magnetic recording medium 20 is the magnetic disk, the texturing process is carried out in the circumferential direction of the magnetic disk, that is, in the direction in which the track on the magnetic disk extends. The second seed layer 23 is not essential and may be omitted.

The underlayer 24 may be made of Cr or a Cr alloy such as CrMo, CrW, CrV, CrB and CrMoB, or an alloy having a B2 structure such as AlRu, NiAl and FeAl. When the underlayer 24 is epitaxially grown on the second seed layer 23, the underlayer 24 shows a good orientation of the (001) face or the (112) face in the growth direction if the alloy having the B2 structure is used for the underlayer 24, and shows a good orientation of the (002) face in the growth direction if the Cr or Cr alloy is used for the underlayer 24. The underlayer 24 may have a multi-layer structure made up of a plurality of stacked layers formed by the Cr or Cr alloy and the alloy having the B2 structure. The orientation of the underlayer 24 itself is improved by employing the multi-layer structure for the underlayer 24. In addition, by employing the multi-layer structure for the underlayer 24, a good epitaxial growth of the nonmagnetic intermediate layer 25 can be achieved, and the orientations of the ferromagnetic layer 26 and the magnetic layer 29 can further be improved.

The nonmagnetic intermediate layer 25 may be made of a nonmagnetic alloy having an hcp structure and obtained by adding M to a CoCr alloy, where M denotes an element selected from Pt, B, Mo, Nb, Ta, W and Cu or an alloy thereof. The nonmagnetic intermediate layer 25 has a thickness in a range of 1 nm to 5 nm. The nonmagnetic intermediate layer 25 is epitaxially grown to inherit the crystal properties and crystal grain sizes of the underlayer 24. Hence, the nonmagnetic intermediate layer 25 improves the crystal properties of the ferromagnetic layer 26 and the magnetic layer 29 which are epitaxially grown afterwards, reduces a distribution width of the crystal grain (magnetic grain) sizes, and promotes the in-plane orientation of the c-axis. The in-plane orientation refers to the orientation in a direction parallel to the substrate surface. The nonmagnetic intermediate layer 25 may have a multi-layer structure which is made up of a plurality of layers which are made of the above described alloys and stacked. Therefore, the nonmagnetic intermediate layer 25 improves the orientation of the ferromagnetic layer 26 and the magnetic layer 29.

The lattice constant of the nonmagnetic intermediate layer 25 may be made slightly different, that is, a several % different, from the lattice constant of the ferromagnetic layer 26 or the magnetic layer 29, so as to generate an internal stress in the in-plane direction at an interface of the nonmagnetic intermediate layer 25 and the ferromagnetic layer 26 or within the ferromagnetic layer 26. In this case, it is possible to increase the static coercivity of the ferromagnetic layer 26.

The ferromagnetic layer 26 may be made of Co, Ni, Fe, Co alloy, Ni alloy, Fe alloy and the like. It is particularly preferable to use CoCrTa, CoCrPt or alloys thereof for the ferromagnetic layer 26. The preferable CoCrTa alloy and the CoCrPt alloy may be obtained by adding an element selected from B, Mo, Nb, Ta, W and Cu or an alloy thereof. The ferromagnetic layer 26 has a thickness in a range of 1 nm to 10 nm. The ferromagnetic layer 26 is epitaxially grown in a (11-20) direction on the nonmagnetic intermediate layer 25, where "(11-20)" denotes ("1" "1" "2 bar" "0"), and the c-axis is orientated in the in-plane direction and the axis of easy magnetization matches the in-plane direction. The ferromagnetic layer 26 may have a multi-layer structure which is made up of a plurality of layers which are made of the above described alloys and stacked. The ferromagnetic layer 26 improves the orientation of the magnetic layer 29.

The nonmagnetic coupling layer 28 may be made of Ru, Rh, Ir, Ru alloy, Rh alloy, Ir alloy and the like, for example. Rh and Ir have an fcc structure, while Ru has the hcp structure. The lattice constant a=0.25 nm for the CoCrPt alloy used for the ferromagnetic layer 26, while the lattice constant a=0.27 nm for the Ru used for the nonmagnetic coupling layer 28. Hence, it is preferable to use Ru or Ru alloy for the nonmagnetic coupling layer 28 so as to have the lattice parameter a close to that of the ferromagnetic layer 26. The Ru alloy used for the nonmagnetic coupling layer 28 may preferably be an alloy of Ru and an element selected from Co, Cr, Fe, Ni and Mn or an alloy thereof.

The nonmagnetic coupling layer 28 has a thickness in a range of 0.4 nm to 1.5 nm, and more preferably in a range of 0.6 nm to 0.9 nm. In a case where the Ru alloy is used for the nonmagnetic coupling layer 28, the nonmagnetic coupling layer 28 has a thickness in a range of 0.8 nm to 1.4 nm, although the thickness depends on the Ru content within the Ru alloy. The ferromagnetic layer 26 and the magnetic layer 29 are exchange-coupled via the nonmagnetic coupling layer 28, and the magnetization of the ferromagnetic layer 26 and the magnetization of the magnetic layer 29 are coupled antiferromagnetically by setting the thickness of the nonmagnetic coupling layer 28 in the thickness range described above. As a result, in a state where no external field is applied to the magnetic recording medium 20, the magnetization direction of the ferromagnetic layer 26 and the magnetization direction of the magnetic layer 29 become mutually antiparallel, as described above in conjunction with FIG. 1.

The magnetic layer 29 may be made of Co, Ni, Fe, Co alloy, Ni alloy, Fe alloy and the like, similarly as in the case of the ferromagnetic layer 26. It is particularly preferable to use CoCrTa, CoCrPt or alloys thereof for the magnetic layer 29. The preferable CoCrTa alloy and the CoCrPt alloy may be obtained by adding an element selected from B, Mo, Nb, Ta, W and Cu or an alloy thereof. The magnetic layer 29 has a thickness in a range of 5 nm to 30 nm. The magnetic layer 29 may have a multi-layer structure made up of a plurality of stacked layers.

If the remanent magnetization and the thickness of the ferromagnetic layer 26 are denoted by Mr1 and t1 and the remanent magnetization and the thickness of the magnetic layer 29 are denoted by Mr2 and t2, it is preferable that the magnetic layer 29 and the ferromagnetic layer 26 satisfy a relationship Mr1t1<Mr2t2. In this case, the magnetic layer 29 has the net remanent magnetization and thickness product (Mrt value), and information can accurately be recoded on the magnetic layer 29 in correspondence with the positions where the recording magnetic field of the magnetic head is switched. The magnetic layer 29 and the ferromagnetic layer 26 may satisfy a relationship Mr1t1>Mr2t2, but in this case, the ferromagnetic layer 26 has the net remanent magnetization and thickness product (Mrt value), and it becomes difficult to record the information on the magnetic layer 29 in correspondence with the positions where the recording magnetic field of the magnetic head is switched. Furthermore, because the distance between the magnetic head and the ferromagnetic layer 26 is larger than the distance between the magnetic head and the magnetic layer 29, the reproduced output decreases in this case.

The relationship Hc1'≧Hc2' between the dynamic coercivity Hc1' of the ferromagnetic layer 26 and the dynamic coercivity Hc2' of the magnetic layer 29 is satisfied in this embodiment. By setting the dynamic coercivity Hc2' of the magnetic layer 29 less than or equal to the dynamic coercivity Hc1' of the ferromagnetic layer 26, the magnetization direction of the magnetic layer 29 switches before the magnetization direction of the ferromagnetic layer 26, with respect to the switching of the recording magnetic field of the magnetic head. For this reason, the magnetization transition regions matching the switching timing of the recording magnetic field are formed in the magnetic layer 29, and the NLTS can be reduced.

In order to satisfy the relationship Hc1'≧Hc2' between the dynamic coercivity Hc1' of the ferromagnetic layer 26 and the dynamic coercivity Hc2' of the magnetic layer 29, an anisotropic field Hk1 of the ferromagnetic layer 26 and an anisotropic field Hk2 of the magnetic layer 29 may be set to satisfy a relationship Hk1>Hk2. The following relationship between the dynamic coercivity Hc' and the anisotropic field Hk is described in H. H. Bertram et al., J. Appl. Phys., vol. 85, No. 8, pp. 4991 (1999), where $f_o$ denotes an attempt frequency, $K_u$ denotes an anisotropy constant, V denotes a volume of a magnetic unit, $k_B$ denotes the Boltzmann's constant, and T denotes the absolute temperature.

$$Hc'=0.474Hk[1-1.55\{(k_BT/K_uV)xln(f_ot/ln2)/2\}]^{2/3}$$

Hence, it may be regarded that the magnetic field switching time $t=10^{-9}/\ln 2$ seconds and the anisotropic field Hk and the dynamic coercivity Hc' are proportional. For this reason, by setting the ferromagnetic layer 26 and the magnetic layer 28 to satisfy the relationship Hk1>Hk2, the ferromagnetic layer 26 and the magnetic layer 29 can be set to satisfy the relationship Hc1'≧Hc2'.

On the other hand, in order to satisfy the relationship Hc1'≧Hc2' between the dynamic coercivity Hc1' of the ferromagnetic layer 26 and the dynamic coercivity Hc2' of the magnetic layer 29, the Pt content of the magnetic layer 29 is set smaller than the Pt convent of the ferromagnetic layer 26 when the CoCrPt alloy is used for the ferromagnetic layer 26 and the magnetic layer 29. For example, in a case where the ferromagnetic layer 26 and the magnetic layer 29 are made of CoCrPtB, the Pt content of the ferromagnetic layer 26 is set larger than that of the magnetic layer 29. In other words, the ferromagnetic layer 26 is made of $CoCrPt_{12}B$, and the magnetic layer 29 is made to $CoCrPt_9B$, where the numerals affixed to Pt denotes the Pt content within the alloy in atomic %. Hence, by setting the composition, namely, the Pt content in this case, of the ferromagnetic layer 26 and the magnetic layer 29, the ferromagnetic layer 26 and the magnetic layer 29 can be set to satisfy the relationship Hc1'≧Hc2'.

The protection layer 30 may be made of diamond-like carbon, carbon nitride, amorphous carbon and the like. The protection layer 30 has a thickness in a range of 0.5 nm to 10 nm, and preferably in a range of 0.5 nm to 5 nm.

The lubricant layer 31 may be made of an organic liquid lubricant having perfluoropolyether as a main chain and —OH, benzene ring or the like as the terminal functional group. More particularly, ZDol manufactured by Monte Fluos (terminal functional group: —OH), AM3001 manufactured by Ausimonoto (terminal functional group: benzene ring), Z25 manufactured by Monte Fluos, and the like, with a thickness in a range of 0.5 nm to 3.0 nm, may be used for the lubricant layer 31. The lubricant may be appropriately selected depending on the material used for the protection layer 30.

The layers 22 through 30 may be successively formed on the substrate 21 by sputtering, vacuum deposition and the like. On the other hand, the lubricant layer 31 may be formed by dipping, spin-coating and the like. In a case where the magnetic recording medium 20 has a tape-shape, the lubricant-layer 31 may be formed by die-coating.

Next, a description will be given of a case where this embodiment is applied to the magnetic disk. First, a NiP first seed layer 22 having a thickness of 25 nm was formed on a glass substrate 21, and the surface of the NiP first seed layer 22 was exposed to the atmosphere and oxidized. The second seed layer 23 was omitted in this particular case. An underlayer 24 having a multi-layer structure made up of a 5 nm CrMoW layer and a 3 nm CrMo layer, was formed on the NiP first seed layer 22. A CoCrTa nonmagnetic intermediate layer 25 having a thickness of 1 nm, a CoCrPt$_x$B alloy ferromagnetic layer 26 having a thickness of 5 nm, a Ru nonmagnetic coupling layer 28 having a thickness of 0.8 nm, a CoCrPt$_{12}$B alloy magnetic layer 29 having a thickness of 17 nm, and a diamond-like carbon protection layer 30 having a thickness of 4.5 nm were successively formed on the NiP first seed layer 22. The layers 22 and 24 through 30 were formed by use of a DC magnetron sputtering apparatus. A suitable lubricant layer 31 was formed on the diamond-like carbon protection layer 30 by dipping. The Pt content of the CoCrPt$_x$B alloy ferromagnetic layer 26 was changed to x=0, 2.5, 5.0, 7.5, 10.0 and 16 atomic %. The Cr content and the B content of the CoCrPt$_x$B alloy ferromagnetic layer 26 and the CoCrPt$_{12}$B alloy magnetic layer 29 were respectively set to approximately the same values (atomic %)

Next, the magnetic disk was set on a spin stand LS90 manufactured by Kyodo Electronic System, to measure the overwrite performance and the NLTS performance by a composite magnetic head. In addition, the static coercivity (coercivity in the in-plane direction with respect to the substrate 21) was measured using the Kerr effect.

Figure 13:
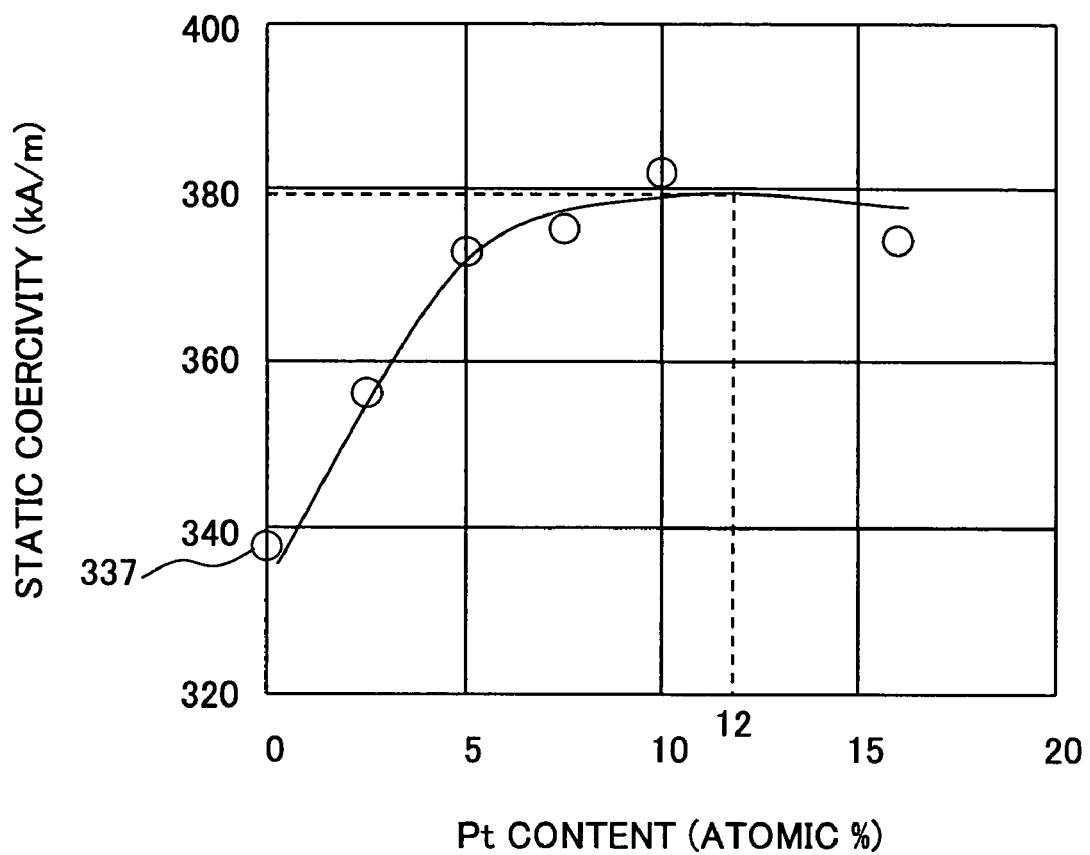
FIG. 13 is a diagram showing a relationship of a static coercivity and a Pt content of a ferromagnetic layer.
Figure 14:
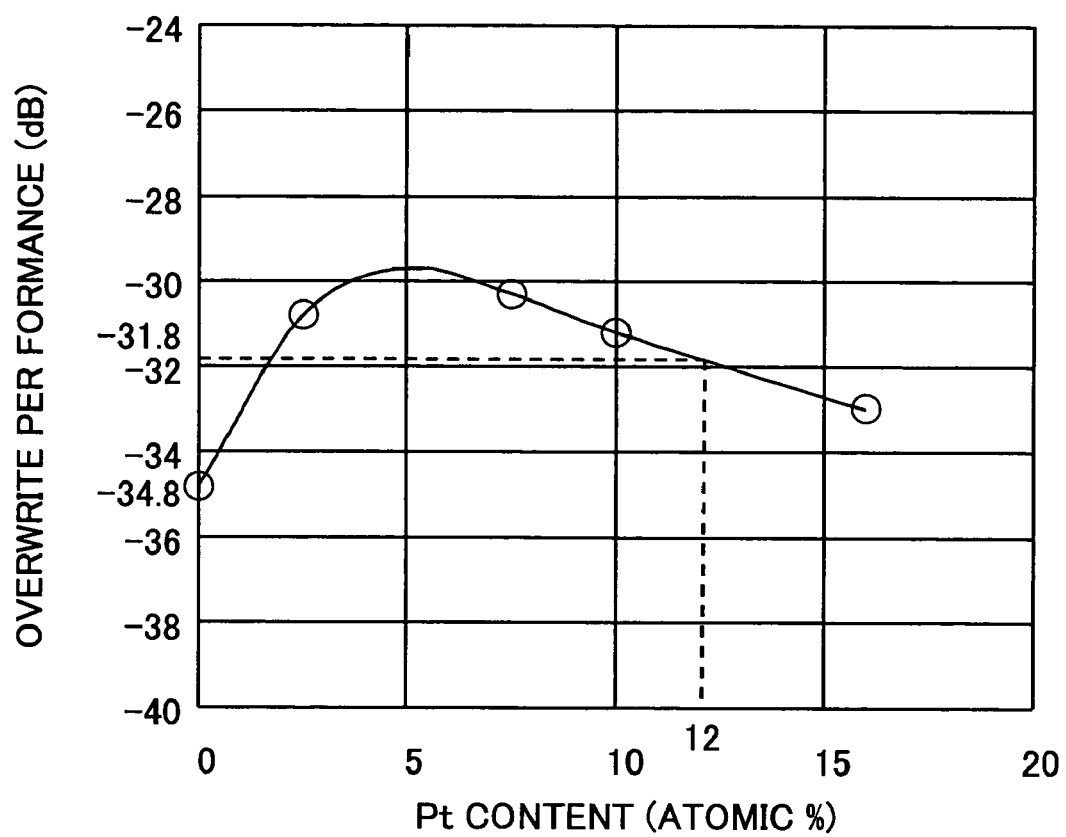
FIG. 14 is a diagram showing a relationship of an overwrite performance and the Pt content of the ferromagnetic layer.

FIG. 13 is a diagram showing a relationship of the static coercivity of the magnetic disk and the Pt content of the ferromagnetic layer 26, and FIG. 14 is a diagram showing a relationship of the overwrite performance of the magnetic disk and the Pt content of the ferromagnetic layer 26. In FIG. 13, the ordinate indicates the static coercivity (kA/m), and the abscissa indicates the Pt content (atomic %). In FIG. 14, the ordinate indicates the overwrite performance (dB), and the abscissa indicates the Pt content (atomic %).

As may be seen from FIGS. 13 and 14, the static coercivity of the magnetic disk simply increases with the increase in the Pt content of the ferromagnetic layer 26 and approximately saturates at the Pt content of 10 atomic %, while the overwrite performance shows a peak approximately at the Pt content of 5 atomic % with the increase in the Pt content of the ferromagnetic layer 26 and shows a satisfactory value for Pt contents greater than 5 atomic %. When the Pt content of the ferromagnetic layer 26 is further increased from 12 atomic % to 16 atomic %, it may be seen from the curve shown in FIG. 14 which approximates the points that the overwrite performance for the Pt content of 16 atomic % is greatly improved over the overwrite performance for the Pt content of 12 atomic %.

In the conventional magnetic recording medium having the magnetic layer with the single-layer structure, the overwrite performance deteriorates if the static coercivity of the magnetic layer increases. But according to this embodiment, it was confirmed that the overwrite performance can be improved even when the static coercivity of the magnetic layer 29 increases, by increasing the Pt content of the ferromagnetic layer 26. In other words, by setting the Pt content of the magnetic layer 29 less than or equal to the Pt content of the ferromagnetic layer 26, the overwrite performance is improved.

From the curve shown in FIG. 14 which approximates the points, the overwrite performance is −31.8 dB when the Pt content of the ferromagnetic layer 26 is 12 atomic %, and is deteriorated compared to the case where the Pt content is 0 atomic %, but it may be regarded that this is due to the high static coercivity of 43 kA/m. If 2 magnetic disks with the same static coercivity were made with the ferromagnetic layers 26 having the Pt contents of 0 and 12 atomic %, it may be readily seen that the magnetic disk with the ferromagnetic layer 26 having the Pt content of 12 atomic % has an improved overwrite performance compared to that of the magnetic disk with the ferromagnetic layer 26 having the Pt content of 0 atomic %. This is because, the overwrite performance of the magnetic disk with a smaller static coercivity and the ferromagnetic layer 26 having the Pt content of 5 atomic % is improved compared to that of the magnetic disk wit the ferromagnetic layer 26 having the Pt content of 12 atomic %. Accordingly, it may be seen that the write performances of the magnetic disk are improved by setting the Pt content of the magnetic layer 29 less than or equal to the Pt content of the ferromagnetic layer 26.

Figure 15:
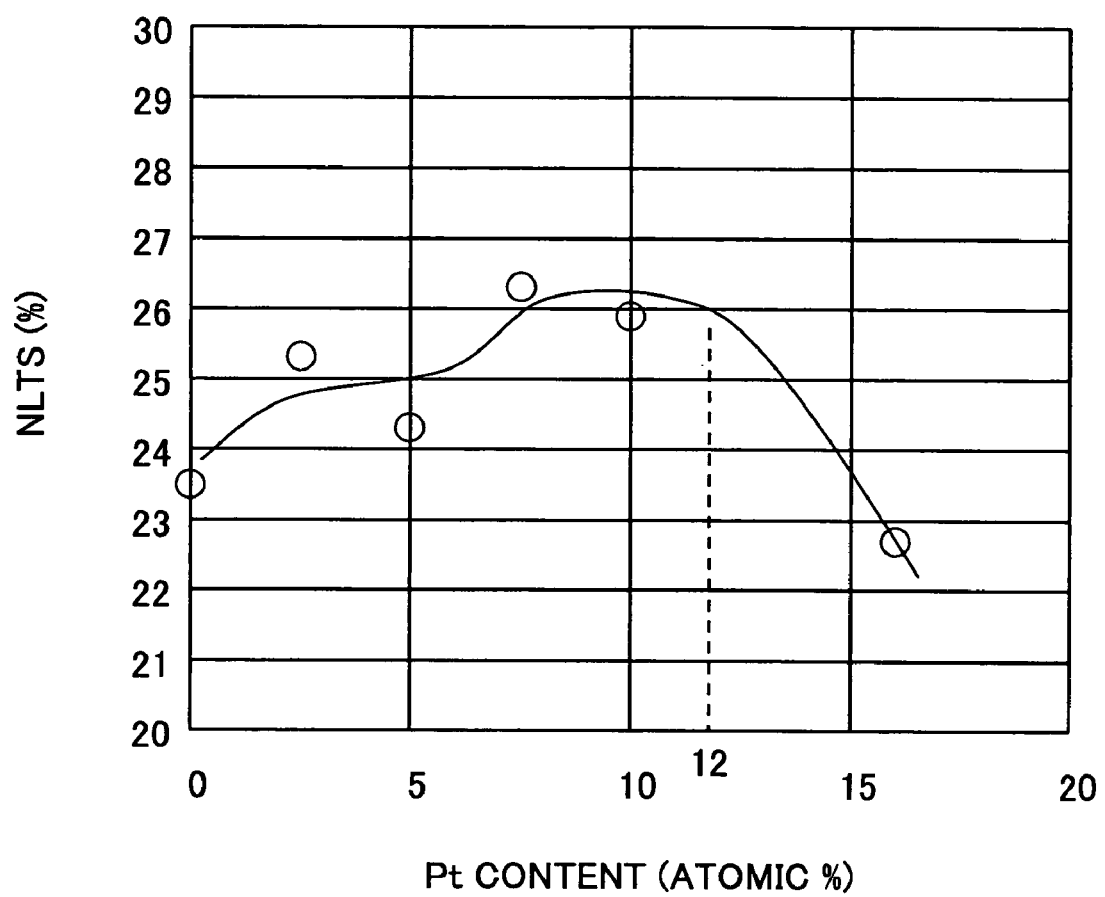
FIG. 15 is a diagram showing a relationship of an NLTS performance and the Pt content of the ferromagnetic layer.

FIG. 15 is a diagram showing a relationship of the NLTS performance of the magnetic disk and the Pt content of the ferromagnetic layer 26. In FIG. 15, the ordinate indicates the NLTS performance (%), and the abscissa indicates the Pt content (atomic %). As may be seen from FIG. 15, the NLTS performance deteriorates with respect to the increase of the Pt content of the ferromagnetic layer 26 and approximately saturates at the Pt content of 10 atomic %, but greatly improves at the Pt content of 16 atomic %. From the curve shown in FIG. 15 which approximates the points, the NLTS performance is 25.5% at the Pt content of 12 atomic %, and is deteriorated compared to the NLTS performance which is 23.5% at the Pt content of 0 atomic %. However, as the Pt content of the ferromagnetic layer 26 is further increased so that the Pt content is greater than 12 atomic %, it may be seen from FIG. 15 that the NLTS performance improves to thereby improve the write performances.

Figure 16:
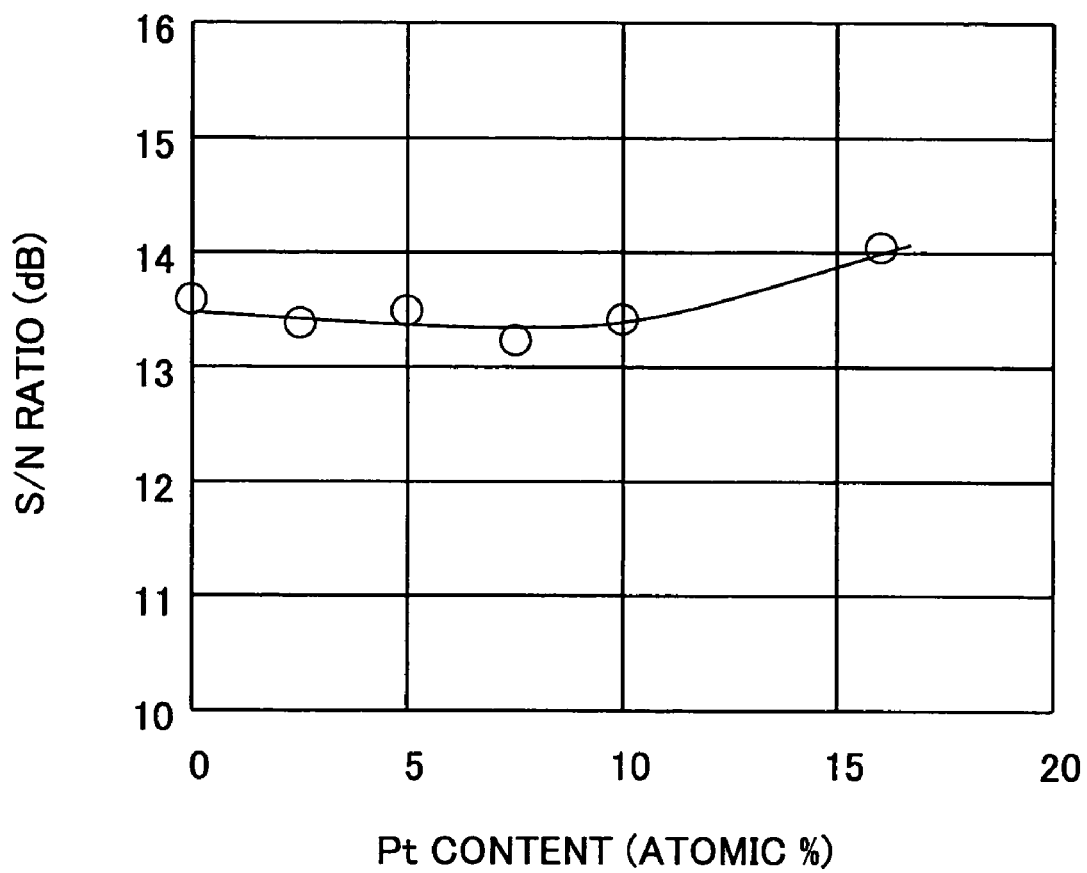
FIG. 16 is a diagram showing a relationship of a signal-to-noise (S/N) ratio and the Pt content of the ferromagnetic layer.

FIG. 16 is a diagram showing a relationship of a signal-to-noise (S/N) ratio of the magnetic disk and the Pt content of the ferromagnetic layer 26. In FIG. 16, the ordinate indicates the S/N ratio (dB), and the abscissa indicates the Pt content (atomic %). As may be seen from FIG. 16, although the S/N ratio is approximately constant with respect to the increase in the Pt content of the ferromagnetic layer 26 up to the Pt content of 10 atomic %, the S/N ratio improves from the Pt content of approximately 12 atomic % to 16 atomic %. Hence, it may be seen that the S/N ratio can be improved by setting the Pt content of the magnetic layer 29 less than or equal to the Pt content of the ferromagnetic layer 26.

Next, a description will be given of the evaluation of the dynamic coercivity and the rate of change of the reproduced-output-to-total-noise (S/Nt) ratio (hereinafter simply referred to as S/Nt change).

[Evaluation of Dynamic Coercivity]

The dynamic coercivity was measured for the magnetic disk according to this embodiment described above, using a spin stand and a magnetic head, under the following measuring conditions.

Spin Stand: LS90 manufactured by Kyodo Electronic System

Analyzer: DHA9701 manufactured by Japan Technobute

Rotational Speed: 5200 rpm

Measuring Position: 16 mm Radius

Recording Gap Length Of Magnetic Head: 180 nm

Figure 17:
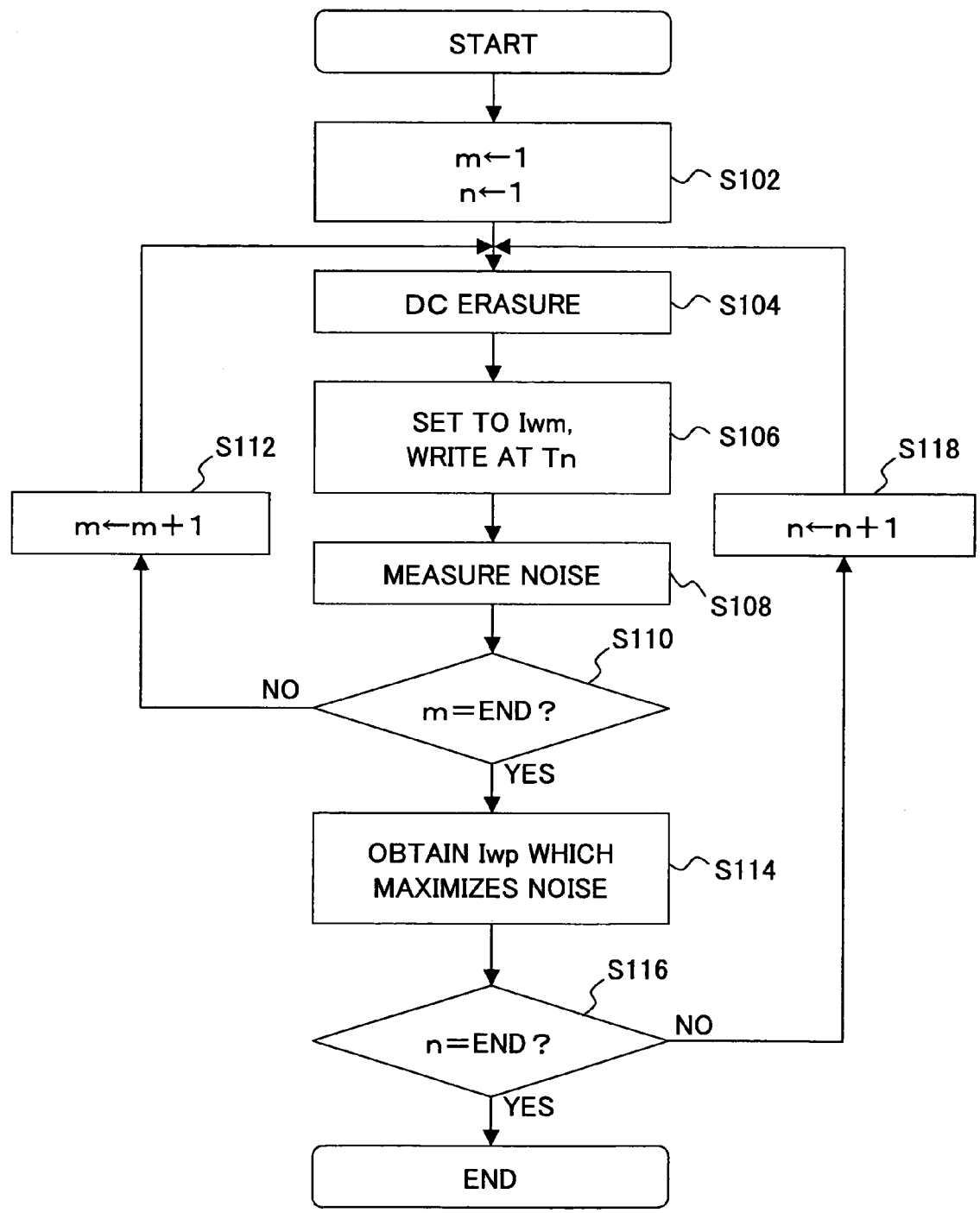
FIG. 17 is a flow chart for explaining a dynamic coercivity measuring procedure.

FIG. 17 is a flow chart for explaining a dynamic coercivity measuring procedure for measuring the dynamic coercivity Hc'. First, a step S102 shown in FIG. 17 sets m and n of a recording current Iwm and a write rotational number Tn to respective initial values "1". The recording current Iwm (m=1 to END) is changed from a small value on the order of approximately 10 mA to a maximum value which approximately saturates in appropriate increments or steps. The rotational number Tn is related to the write time, and the write time per revolution of the magnetic disk corresponds to a time GL/v, where GL denotes the magnetic head recording gap length and v denotes the peripheral (or circumferential)

velocity of the magnetic disk. The rotational number Tn is changed from 1 rotation to approximately 5000 rotations in appropriate increments or steps.

Next, a step S104 carries out a DC erasure in a predetermined direction with respect to the magnetic disk. During the DC erasure, the recording current Iwm is set to a value which can saturate the magnetic layer 29. Then, a step S106 applies a recording current Iw1 to the magnetic head so as to apply a magnetic field to the magnetic disk in a direction opposite to the direction in which the DC erasure was made, at a rotational number T1. A step S108 measures the medium noise of the magnetic disk for a frequency range of approximately 10 MHz to 2 or 3 times the write frequency.

Thereafter, a step S110 decides whether or not m=END. If the decision result in the step S110 is NO, a step S112 increments m of the recording current Iwm to m=m+1, and the process returns to the step S104. On the other hand, if the decision result in the step S110 is YES, a step S114 obtains a recording current Iwp which makes the medium noise a maximum. This recording current Iwp corresponds to a most random recording state, that is, a state where the remanent magnetization is 0. Accordingly, the recording current Iwp corresponds to the dynamic coercivity, and the recording current Iwp is regarded as the dynamic coercivity at the rotational number T1.

A step S116 decides whether or not n=END. If the decision result in the step S116 is NO, a step S118 increments n of the rotational number Tn to n=n+1, and the process returns to the step S104. The process ends if the decision result in the step S116 is YES.

Next, the rotational number Tn is converted into a write time tw (=Tn×GL/v), and the recording current Iwp is converted into the dynamic coercivity Hc' (=Iwp×α), where α denotes a parameter which is determined by the relationship of the recording current Iwm and the recording magnetic field of the magnetic head. Of course, the recording current Iwp may be converted into the dynamic coercivity Hc', because the relationship of the magnitudes of the dynamic coercivities of the magnetic layer 29 and the ferromagnetic layer 26 is to be obtained.

[Evaluation of S/Nt Change]

The S/Nt change was measured for the magnetic disk according to this embodiment described above, using a spin stand and a magnetic head, under the following measuring conditions, similarly to the evaluation of the dynamic coercivity. The spin stand and the analyzer used for the evaluation of the dynamic coercivity were also used for this evaluation of the S/Nt change.

Write Frequency: 110 MHz
Rotational Speed: 3670 rpm
Measuring Position: 23 mm Radius
Recording Gap Length Of Magnetic Head: 180 nm The reproduced output S is obtained when the magnetic head reproduces the signal written on the magnetic disk at the above write frequency. On the other hand, the total noise Nt includes the medium noise, the head noise and the equipment noise. The total noise Nt was measured at appropriate time intervals. The S/Nt change (dB/decode) was obtained from the S/Nt measured after a time t1 from the time of writing the signal on the magnetic disk, and the S/Nt measured after a further time t2. The S/Nt was measured in a state where the offtrack of the magnetic head with respect to the recorded track on the magnetic disk is minimized to the extent possible. The evaluation of the S/Nt change was made at a temperature of 25° C.

FIG. 18 is a diagram showing characteristics of the dynamic coercivity and the S/Nt change of the magnetic recording media. In FIG. 18, a disk D1 corresponds to the magnetic disk according to this embodiment having the ferromagnetic layer 26 with the Pt content of 16 atomic % and the magnetic layer 29 with the Pt content of 12 atomic %. A disk D2 corresponds to a comparison example of the magnetic disk not employing the present invention, and a disk D3 corresponds to another comparison example of the magnetic disk not employing the present invention. In the case of the disk D2, the Pt contents of the ferromagnetic layer 16 and the magnetic layer 18 respectively are 0 atomic % and 12 atomic %. In the case of the disk D3, the Pt contents of the ferromagnetic layer 16 and the magnetic layer 18 respectively are 7.5 atomic % and 12 atomic %. As may be seen from FIG. 18, the S/Nt change of the disk D1 of this embodiment is greatly improved, that is, greatly reduced, compared to those of the comparison example disks D2 and D3. In addition, although the disks D1 and D3 show approximately the same dynamic coercivities, the S/Nt change of the disk D1 is 0.064 dB smaller than that of the disk D3.

The Pt content of the magnetic layer is 12 atomic % for each of the disks D1, D2 and D3. However, the Pt content of the ferromagnetic layer is 16 atomic % for the disk D1, 0 atomic % for the disk D2, and 7.5 atomic % for the disk D3. The Pt contents of the magnetic layer and the ferromagnetic layer are related to the dynamic coercivity via the anisotropic field. Hence, it may be regarded that the relationship in which the dynamic coercivity of the ferromagnetic layer is greater than that of the magnetic layer stands in the case of the disk D1, and that the relationship in which the dynamic coercivity of the ferromagnetic layer is less than that of the magnetic layer stands in the case of the disks D2 and D3. Therefore, it may be seen that the S/Nt change is even further reduced by setting the dynamic coercivity of the ferromagnetic layer to be less than the dynamic coercivity of the magnetic layer.

Modification of First Embodiment

Figure 19:
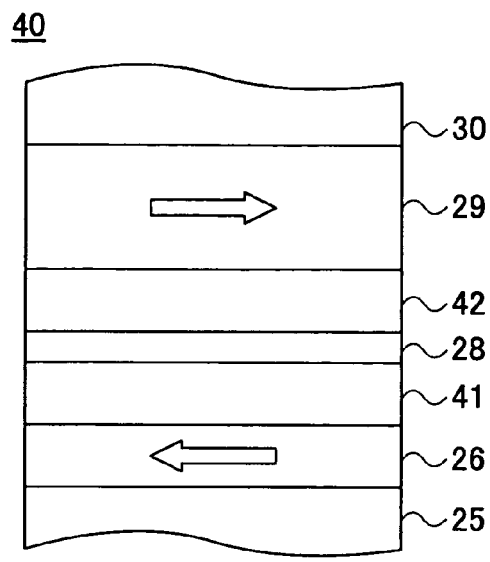
FIG. 19 is a cross sectional view showing an important part of a modification of the first embodiment of the magnetic recording medium.

FIG. 19 is a cross sectional view showing an important part of a modification of the first embodiment of the magnetic recording medium. In FIG. 19, those parts which are the same as those corresponding parts in FIG. 12 are designated by the same reference numerals, and a description thereof will be omitted.

In this modification, a magnetic recording medium 40 is provided with at least one of a ferromagnetic bonding layer 41 and a magnetic bonding layer 42. The ferromagnetic bonding layer 41 may be provided between the ferromagnetic layer 26 and the nonmagnetic coupling layer 28. The magnetic bonding layer 42 may be provided between the nonmagnetic coupling layer 28 and the magnetic layer 29.

The ferromagnetic bonding layer 41 is exchange-coupled to the adjacent ferromagnetic layer 26, and the magnetization directions of the ferromagnetic bonding layer 41 and the ferromagnetic layer 26 are mutually parallel. The magnetic bonding layer 42 is exchange-coupled to the magnetic layer 29, and the magnetization directions of the magnetic bonding layer 42 and the magnetic layer 29 are mutually parallel. By providing the ferromagnetic bonding layer 41 and/or the magnetic bonding layer 42, the mutual exchange coupling and the exchange field acting between the ferromagnetic bonding layer 41 and the magnetic layer 29, and/or between the ferromagnetic layer 26 and the magnetic bonding layer 42, and/or between the ferromagnetic bonding layer 41 and the magnetic bonding layer 42, respectively become larger than the mutual exchange coupling and the exchange field acting between the ferromagnetic layer 26 and the magnetic layer 29. As a result, the exchange field acting on the magnetic layer 29 in the direction of the recording magnetic field when the recording magnetic field is switched becomes large, thereby making it easier for the magnetization direction of the magnetic layer 29 to switch. Consequently, the write performances of the magnetic recording medium 40 of this modification is further improved compared to those of the magnetic recording medium 20 of the first embodiment. Moreover, the thermal stability of the magnetic recording medium 40 is further improved compared to that of the magnetic recording medium 20 because the mutual exchange coupling also becomes larger according to this modification.

The ferromagnetic bonding layer 41 and the magnetic layer 42 may be made of Co, Ni, Fe, Co alloy, Ni alloy, Fe alloy and the like. When CoCrTa or CoCrPt is used for the ferromagnetic bonding layer 41 and/or the magnetic layer 42, it is preferable to further add an element selected from B, Mo, Nb, Ta, W, Cu and alloys thereof to CoCrTa or CoCrPt. Each of the ferromagnetic bonding layer 41 and the magnetic bonding layer 42 has a thickness of 0.2 nm to 5 nm, for example. In a case where the ferromagnetic bonding layer 41 or the magnetic bonding layer 42, the ferromagnetic layer 26 and the magnetic layer 29 are made of alloys including Co or Fe as the main component, it is preferable to set the Co content or the Fe content of the ferromagnetic bonding layer 41 or the magnetic bonding layer 42 larger than the corresponding Co content or Fe content of the ferromagnetic layer 26 or the magnetic layer 29. By setting the Co or Fe contents in this manner, it is possible to make the mutual exchange coupling between the ferromagnetic bonding layer 41 and the magnetic bonding layer 42 larger than the mutual exchange coupling between the ferromagnetic layer 26 and the magnetic layer 29.

Second Embodiment

Figure 20:
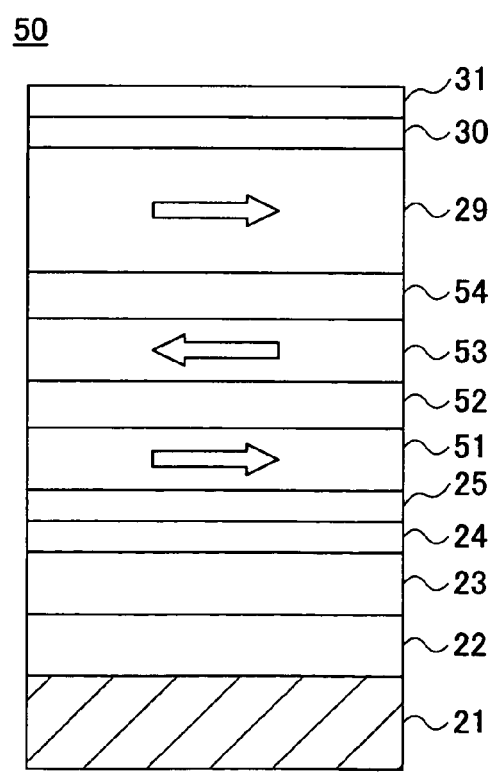
FIG. 20 is a cross sectional view showing an important part of a second embodiment of the magnetic recording medium according to the present invention.

FIG. 20 is a cross sectional view showing an important part of a second embodiment of the magnetic recording medium according to the present invention. In FIG. 20, those parts which are the same as those corresponding parts in FIG. 12 are designated by the same reference numerals, and a description thereof will be omitted.

As shown in FIG. 20, a magnetic recording medium 50 is provided with a first ferromagnetic layer 51, a first nonmagnetic coupling layer 52, a second ferromagnetic layer 53, and a second nonmagnetic coupling layer 54. These layers 51 through 54 are stacked between the nonmagnetic intermediate layer 25 and the magnetic layer 29. The first and second ferromagnetic layers 51 and 53 are made of materials similar to the material used for the ferromagnetic layer 26 of the first embodiment. Similarly, the first and second nonmagnetic coupling layers 52 and 54 are made of materials similar to the material used for the nonmagnetic coupling layer 28 of the first embodiment.

The first and second ferromagnetic layers 51 and 53 are exchange-coupled, and in a state where no external magnetic field is applied to the magnetic recording medium 50, the magnetization directions of the first and second ferromagnetic layers 51 and 53 are mutually antiparallel. The second ferromagnetic layer 53 and the magnetic layer 29 are exchange-coupled, and in the state where no external magnetic field is applied to the magnetic recording medium 50, the magnetization directions of the second ferromagnetic layer 53 and the magnetic layer 29 are mutually antiparallel, similarly to the relationship of the ferromagnetic layer 26 and the magnetic layer 29 of the first embodiment.

In the magnetic recording medium 50 of this embodiment, the dynamic coercivity Hc3' of the first ferromagnetic layer 51, the dynamic coercivity Hc1' of the second ferromagnetic layer 53 and the dynamic coercivity Hc2' of the magnetic layer 29 satisfy a relationship $Hc1' \geqq Hc2'$ and $Hc3' \leqq Hc2'$. Because this relationship is satisfied, the magnetization direction of the first ferromagnetic layer 51 switches first in the direction of the recording magnetic field when the direction of the recording magnetic field is switched. In addition, the first ferromagnetic layer 51 applies an exchange field in a direction opposite to the direction of the recording magnetic field, with respect to the second ferromagnetic layer 53 which is exchange-coupled to the first ferromagnetic layer, so as to maintain the magnetization direction of the second ferromagnetic layer 53.

Accordingly, the magnetization direction of the second ferromagnetic layer 53 uneasily switches in the direction of the recording magnetic field due to the magnetization of the magnetic layer 29, and the magnetization of the second ferromagnetic layer 53 is stabilized. Moreover, since the second ferromagnetic layer 53 applies an exchange field in the same direction as the recording magnetic field with respect to the magnetic layer 29, the magnetization direction of the magnetic layer 29 more easily switches in the direction of the recording magnetic field, to thereby further improve the write performances. Furthermore, since the three layers, namely, the first ferromagnetic layer 51, the second ferromagnetic layer 53 and the magnetic layer 29, are mutually exchange-coupled, it is possible to improve the thermal stability of the magnetic recording medium 50. It is preferable that the dynamic coercivity Hc3' is small from the point of view of improving the following response of the magnetization of the first ferromagnetic layer 51 with respect to the switching of the recording magnetic field.

The exchange fields from both the first ferromagnetic layer 51 and the magnetic layer 29 act on the second ferromagnetic layer 53. For this reason, the magnetization direction of the second ferromagnetic layer 53 more quickly attempts in the direction opposite to the magnetization direction of the magnetic layer 29 with the lapse of time after the recording.

It is preferable that the Pt content of the first ferromagnetic layer 51 is smaller than the Pt content of the magnetic layer 29 by 7 atomic % or more or, that the Pt content of the first ferromagnetic layer 51 is on the order of the atomic % of impurities. In this case, it is possible to improve the following response of the magnetization of the first ferromagnetic layer 51 with respect to the switching of the recording magnetic field, and more quickly switch the magnetization direction of the first ferromagnetic layer 51, so that the first ferromagnetic layer 51 causes an exchange field to act on the second ferromagnetic layer 53 in the direction opposite to the direction of the recording magnetic field.

Modification of Second Embodiment

Figure 21:
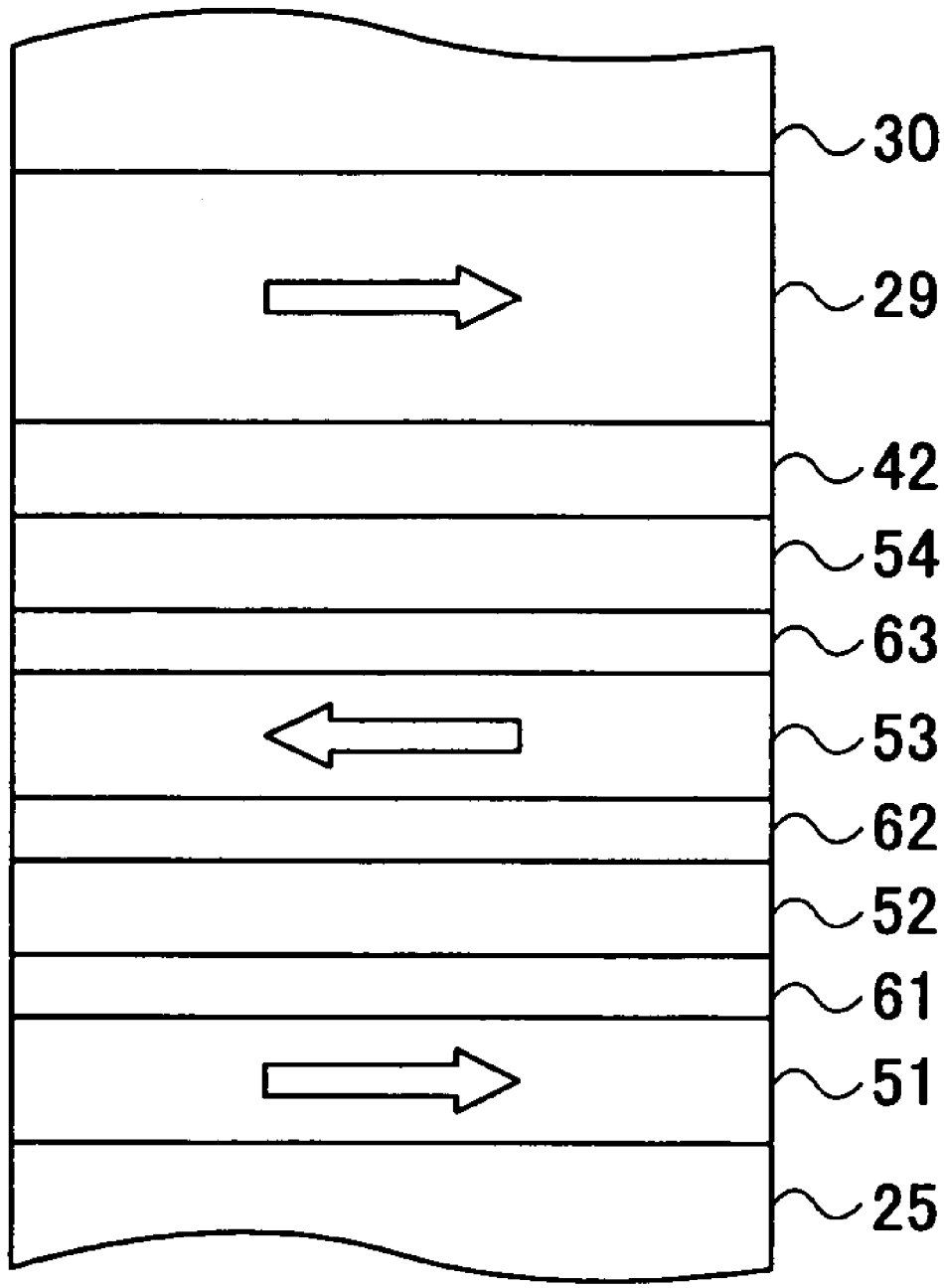
FIG. 21 is a cross sectional view showing an important part of a modification of the second embodiment of the magnetic recording medium.

FIG. 21 is a cross sectional view showing an important part of a modification of the second embodiment of the magnetic recording medium. In FIG. 21, those parts which are the same as those corresponding parts in FIGS. 19 and 20 are designated by the same reference numerals, and a description thereof will be omitted.

In this modification, a magnetic recording medium 60 is provided with at least one of a first ferromagnetic bonding layer 61, a lower second ferromagnetic bonding layer 62, an upper second ferromagnetic bonding layer 63 and a magnetic bonding layer 42. The first ferromagnetic bonding layer 61 is provided between the first ferromagnetic layer 51 and the first nonmagnetic coupling layer 52. The lower second ferromagnetic bonding layer 62 is provided between the first nonmagnetic coupling layer 52 and the second ferromagnetic layer 53. The upper second ferromagnetic bonding layer 63 is provided between the second ferromagnetic layer 53 and the second nonmagnetic coupling layer 54. The magnetic bonding layer 42 is provided between the second nonmagnetic coupling layer 54 and the magnetic layer 29, and the material and thickness used for the magnetic bonding layer 42 are similar to those used for the magnetic bonding layer 42 of the magnetic recording medium 40 shown in FIG. 19 described above.

The magnetic recording medium 60 of this modification is basically a combination of the magnetic recording medium 50 of the second embodiment and the magnetic recording medium 40 of the modification of the first embodiment. The materials and thicknesses used for the first ferromagnetic bonding layer 61, the lower second ferromagnetic bonding layer 62 and the upper second ferromagnetic bonding layer 63 may be similar to those used for the ferromagnetic bonding layer 41 and the magnetic bonding layer 42.

By providing at least one of the first ferromagnetic bonding layer 61, the lower second ferromagnetic bonding layer 62, the upper second ferromagnetic bonding layer 63 and the magnetic bonding layer 42, it is possible to increase the exchange field that acts on the second ferromagnetic layer 53. As a result, the magnetization direction of the second ferromagnetic layer 53 more quickly attempts in the direction opposite to the magnetization direction of the magnetic layer 29 with the lapse of time after the recording. In other words, it is possible to more quickly achieve a thermally stable state in the magnetic recording medium 60.

In addition, by providing the first ferromagnetic bonding layer 61 and/or the lower second ferromagnetic bonding layer 62, the magnetization directions of the first ferromagnetic layer 51 and the first ferromagnetic bonding layer 61 first switch in the direction of the recording magnetic field when the direction of the recording magnetic field is switched. Consequently, it is possible to apply a larger exchange field in the direction opposite to the direction of the recording magnetic field with respect to the exchange-coupled second ferromagnetic layer 53.

Embodiment of Magnetic Storage Apparatus

Figure 22:
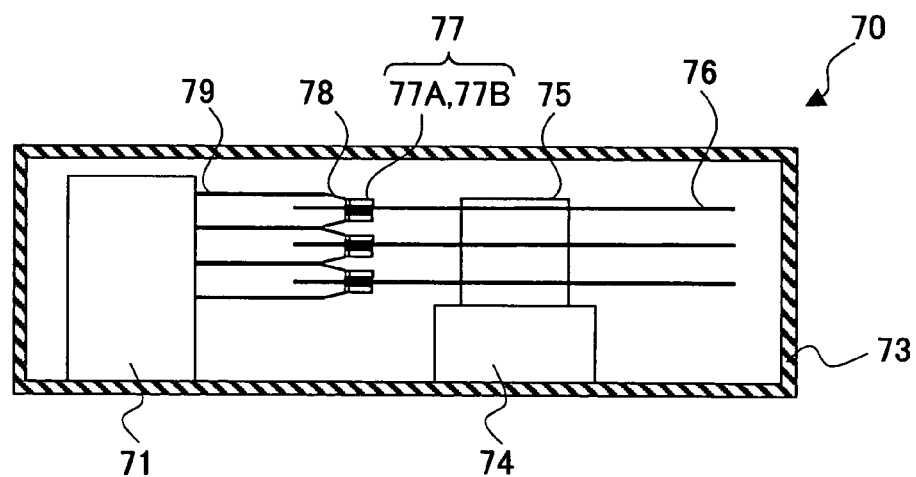
FIG. 22 is a cross sectional view showing an important part of an embodiment of a magnetic storage apparatus according to the present invention.

Next, a description will be given of an embodiment of a magnetic storage apparatus according to the present invention, by referring to FIGS. 22 and 23. FIG. 22 is a cross sectional view showing an important part of this embodiment of the magnetic storage apparatus, and FIG. 23 is a plan view showing an important part of this embodiment of the magnetic storage apparatus shown in FIG. 22.

Figure 23:
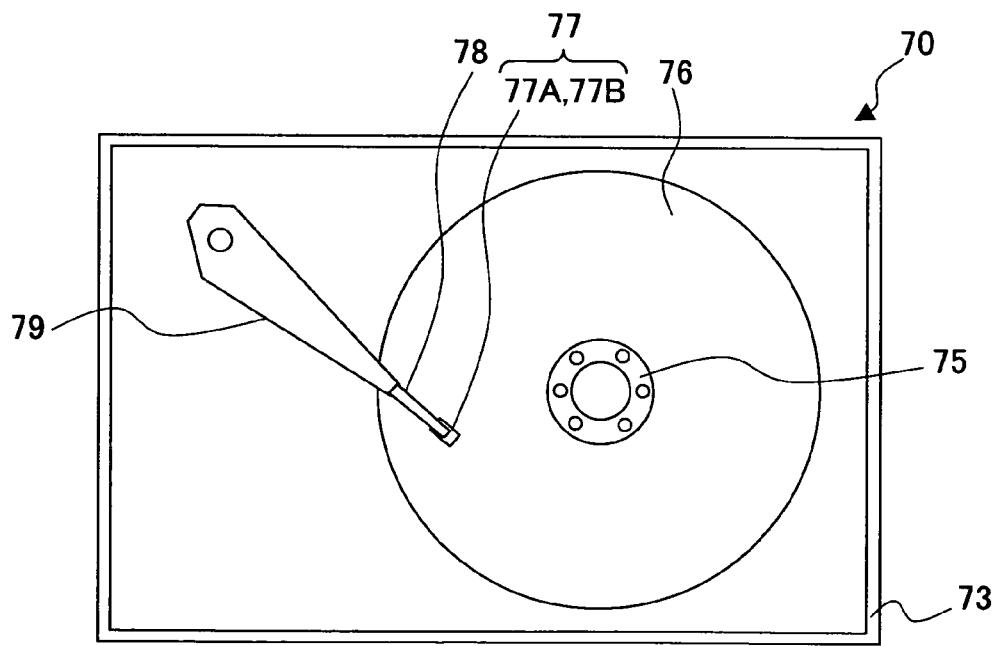
FIG. 23 is a plan view showing an important part of the embodiment of the magnetic storage apparatus shown in FIG. 22.

As shown in FIGS. 22 and 23, a magnetic storage apparatus 70 generally includes a housing 73. A motor 74, a hub 75, a plurality of magnetic recording media 76, a plurality of recording and reproducing heads (composite heads) 77, a plurality of suspensions 78, a plurality of arms 79, and an actuator unit 71 are provided within the housing 73. The magnetic recording media 76 are mounted on the hub 75 which is rotated by the motor 74. The recording and reproducing head 77 is made up of a reproducing head 77A and a recording head 77B. For example an Magneto-Resistive (MR) element, a Giant Magneto-Resistive (GMR) element, a Tunneling Magneto-Resistive (TMR) element, a Current Perpendicular to Plane (CPP) element and the like may be used as the reproducing head 77A. On the other hand, an inductive head such as a thin film head may be used for the recording head 77B. Each recording and reproducing head 77 is mounted on the tip end of a corresponding part 79 via the suspension 78. The arms 79 are moved by the actuator unit 71. The basic construction of this magnetic storage apparatus is known, and a detailed description thereof will be omitted in this specification.

The magnetic storage apparatus 70 is characterized by the magnetic recording media 76. Each of the magnetic recording media 76 has the stacked structure of any of the embodiments or modifications of the magnetic recording medium described above in conjunction with FIGS. 1 through 21. In other words, each of the magnetic recording media 76 may have the structure of any of the magnetic recording media 10, 20, 40, 50 and 60 shown in FIGS. 4 through 8, 12 and 19 through 21. Of course, the number of magnetic recording media 76 is not limited to 3, and only 1, 2 or 4 or more magnetic recording media 76 may be provided.

The basic construction of the magnetic storage apparatus is not limited to that shown in FIGS. 22 and 23. In addition, the magnetic recording medium 76 used in the present invention is not limited to a magnetic disk.

According to the magnetic storage apparatus 70, it is possible to carry out a highly reliable high-density recording, because each magnetic recording medium 76 has a good thermal stability of written bits and low medium noise.

In the magnetic recording medium 50 of the second embodiment described above in conjunction with FIG. 20, an exchange layer structure is formed by the first ferromagnetic layer 51 and the first nonmagnetic coupling layer 52. But another exchange layer structure, similar to this exchange layer structure, may further be provided under this exchange layer structure.

Further, the present invention is not limited to these embodiments, but various variations and modifications may be made without departing from the scope of the present invention.

What is claimed is:

1. A magnetic recording medium comprising:

an exchange layer structure; and a magnetic layer provided on the exchange layer structure, said exchange layer structure comprising a ferromagnetic layer and a nonmagnetic coupling layer provided on the ferromagnetic layer, said ferromagnetic layer and said magnetic layer being exchange-coupled and having mutually antiparallel magnetizations, said ferromagnetic layer and said magnetic layer satisfying a relationship $Hc1' \geqq Hc2'$, where $Hc1'$ denotes a dynamic coercivity of the ferromagnetic layer and $Hc2'$ denotes a dynamic coercivity of the magnetic layer, each of the dynamic coercivities $Hc1'$ and $Hc2'$ referring to a coercivity for a case where a time required to switch a direction of an external magnetic field is on the order of sub-nano second to approximately one nano-second order, said ferromagnetic layer and said magnetic layer satisfying a relationship $Hc1 < Hc2$, where $Hc1$ denotes a static coercivity of the ferromagnetic layer and $Hc2$ denotes a static coercivity of the magnetic layer, each of the static coercivities $Hc1$ and $Hc2$ referring to a coercivity for a case where a time required to switch a direction of an external magnetic field is on the order of seconds or greater, each of the ferromagnetic layer and the magnetic layer is made of a material selected from a group consisting of CoCrPt and CoCrPt-M alloy, where M is an element or alloy thereof selected from a group consisting of B, Mo, Nb, Ta, W and Cu, and a Pt content of the magnetic layer in atomic % is less than a Pt content of the ferromagnetic layer in atomic %, and said ferromagnetic layer has a thickness in a range of 1 nm to 10 nm.

2. The magnetic recording medium as claimed in claim 1, wherein the Pt content of the magnetic layer is at least 1 atomic % less than the Pt content of the ferromagnetic layer.

3. The magnetic recording medium as claimed in claim 1, wherein the ferromagnetic layer and the magnetic layer satisfy a relationship (Hc1'/Hc1)>(Hc2'/Hc2), where Hc1 denotes a static coercivity of the ferromagnetic layer and Hc2 denotes a static coercivity of the magnetic layer, each of the static coercivities Hc1 and Hc2 referring to a coercivity for a case where a time required to switch a direction of an external magnetic field is on the order of seconds or greater.

4. The magnetic recording medium as claimed in claim 1, further comprising:

a ferromagnetic bonding layer disposed between the ferromagnetic layer and the nonmagnetic coupling layer, said ferromagnetic bonding layer and said ferromagnetic layer being exchange-coupled and having mutually parallel magnetizations.

5. The magnetic recording medium as claimed in claim 1, further comprising:

a magnetic bonding layer disposed between the nonmagnetic coupling layer and the magnetic layer, said magnetic bonding layer and said magnetic layer being exchange-coupled and having mutually parallel magnetizations.

6. The magnetic recording medium as claimed in claim 1, further comprising:

a ferromagnetic bonding layer disposed between the ferromagnetic layer and the nonmagnetic coupling layer; and a magnetic bonding layer disposed between the nonmagnetic coupling layer and the magnetic layer, a mutual exchange coupling between the ferromagnetic bonding layer and the magnetic bonding layer being larger than a mutual exchange coupling between the ferromagnetic layer and the magnetic layer.

7. The magnetic recording medium as claimed in claim 6, wherein each of the ferromagnetic bonding layer and the magnetic bonding layer is made of an alloy having Co or Fe as a main component, and Co or Fe contents of each of the ferromagnetic bonding layer and the magnetic bonding layer are greater than corresponding Co or Fe contents of each of the ferromagnetic layer and the magnetic layer.

8. The magnetic recording medium as claimed in claim 6, wherein each of the ferromagnetic bonding layer and the magnetic bonding layer has a thickness in a range of 0.2 nm to 5 nm.

9. The magnetic recording medium as claimed in claim 1, wherein the nonmagnetic coupling layer is made of a material selected from a group consisting of Ru, Rh, Ir, Ru alloy, Rh alloy and Ir alloy.

10. The magnetic recording medium as claimed in claim 1, wherein the nonmagnetic coupling layer has a thickness in a range of 0.4 nm to 1.5 nm.

11. The magnetic recording medium as claimed in claim 1, wherein the ferromagnetic layer and the magnetic layer satisfy a relationship Hk1≧Hk2, where Hk1 denotes an anisotropic field of the ferromagnetic layer and Hk2 denotes an anisotropic field of the magnetic layer.

12. The magnetic recording medium as claimed in claim 1, wherein the magnetic layer has a thickness in a range of 5 nm to 30 nm.

13. A magnetic recording medium comprising:

a first exchange layer structure;

a second exchange layer structure provided on the first exchange layer structure; and a magnetic layer provided on the second exchange layer structure, said first exchange layer structure comprising a first ferromagnetic layer and a first nonmagnetic coupling layer provided on the first ferromagnetic layer, said second exchange layer structure comprising a second ferromagnetic layer and a second nonmagnetic coupling layer provided on the second ferromagnetic layer, said first and second ferromagnetic layers being exchange-coupled and having mutually antiparallel magnetizations, said second ferromagnetic layer and said magnetic layer being exchange-coupled and having mutually antiparallel magnetizations, said first and second ferromagnetic layers and said magnetic layer satisfying a relationship Hc1'≧Hc2' and Hc≦'Hc2', where Hc3' denotes a dynamic coercivity of the first ferromagnetic layer, Hc1' denotes a dynamic coercivity of the second ferromagnetic layer, and Hc2' denotes a dynamic coercivity of the magnetic layer, each of the dynamic coercivities Hc1', Hc2' and Hc3' referring to a coercivity for a case where a time required to switch a direction of an external magnetic field is on the order of sub-nano second to approximately one nanosecond order, each of said first and second ferromagnetic layers and said magnetic layer is made of a material selected from a group consisting of CoCrPt and CoCrPt-M alloy, where M is an element or alloy thereof selected from a group consisting of B, Mo, Nb, Ta, W and Cu, and a Pt content of the first ferromagnetic layer is smaller than a Pt content of the magnetic layer by at least 7 atomic %.

14. The magnetic recording medium as claimed in claim 13, further comprising:

a magnetic bonding layer at least disposed at one location selected from a group consisting of a location between the first ferromagnetic layer and the first nonmagnetic coupling layer, a location between the first nonmagnetic coupling layer and the second ferromagnetic layer, a location between the second ferromagnetic layer and the second nonmagnetic coupling layer, and a location between the second nonmagnetic coupling layer and the magnetic layer, said magnetic bonding layer and an adjacent one of the first ferromagnetic layer, the second ferromagnetic layer and the magnetic layer having mutually parallel magnetizations.

15. The magnetic recording medium as claimed in claim 13, wherein the magnetic layer has a thickness in a range of 5 nm to 30 nm.

16. The magnetic recording medium as claimed in claim 13, wherein at least one of the first and second ferromagnetic layers has a thickness in a range of 1 nm to 10 nm.

17. The magnetic recording medium as claimed in claim 13, wherein each of the first and second nonmagnetic coupling layers is made of a material selected from a group consisting of Ru, Rh, Ir, Ru alloy, Rh alloy and Ir alloy.

18. The magnetic recording medium as claimed in claim 13, wherein each of the first and second nonmagnetic coupling layers has a thickness in a range of 0.4 nm to 1.5 nm.

19. The magnetic recording medium as claimed in claim 13, wherein the second ferromagnetic layer and the magnetic layer satisfy a relationship $Hk1 \geqq Hk2$, where $Hk1$ denotes an anisotropic field of the second ferromagnetic layer and $Hk2$ denotes an anisotropic field of the magnetic layer.

20. A magnetic storage apparatus comprising:
at least one magnetic recording medium having an exchange layer structure and a magnetic layer provided on the exchange layer structure; and
a head to record information on and/or reproduce information from the magnetic recording medium,
wherein exchange layer structure comprises a ferromagnetic layer and a nonmagnetic coupling layer provided on the ferromagnetic layer,
said ferromagnetic layer and said magnetic layer are exchange-coupled and have mutually antiparallel magnetizations, and
said ferromagnetic layer and said magnetic layer satisfy a relationship $Hc1' \geqq Hc2'$, where $Hc1'$ denotes a dynamic coercivity of the ferromagnetic layer and $Hc2'$ denotes a dynamic coercivity of the magnetic layer,
each of the dynamic coercivities $Hc1'$ and $Hc2'$ referring to a coercivity for a case where a time required to switch a direction of an external magnetic field is on the order of sub-nano second to approximately one nano-second order,
said ferromagnetic layer and said magnetic layer satisfying a relationship $Hc1 < Hc2$, where $Hc1$ denotes a static coercivity of the ferromagnetic layer and $Hc2$ denotes a static coercivity of the magnetic layer,
each of the static coercivities $Hc1$ and $Hc2$ referring to a coercivity for a case where a time required to switch a direction of an external magnetic field is on the order of seconds or greater,
each of the ferromagnetic layer and the magnetic layer is made of a material selected from a group consisting of CoCrPt and CoCrPt-M alloy, where M is an element or alloy thereof selected from a group consisting of B, Mo, Nb, Ta, W and Cu, and
a Pt content of the magnetic layer in atomic % is less than a Pt content of the ferromagnetic layer in atomic % and said ferromagnetic layer has a thickness in a range of 1 nm to 10 nm.

21. A magnetic storage apparatus comprising:
at least one magnetic recording medium having a first exchange layer structure, a second exchange layer structure provided on the first exchange layer structure, and a magnetic layer provided on the second exchange layer structure; and
a head to record information on and/or reproduce information from the magnetic recording medium,
wherein said first exchange layer structure comprises a first ferromagnetic layer and a first nonmagnetic coupling layer provided on the first ferromagnetic layer,
said second exchange layer structure comprises a second ferromagnetic layer and a second nonmagnetic coupling layer provided on the second ferromagnetic layer,
said first and second ferromagnetic layers are exchange-coupled and have mutually antiparallel magnetizations,
said second ferromagnetic layer and said magnetic layer are exchange-coupled and have mutually antiparallel magnetizations, and
said first and second ferromagnetic layers and said magnetic layer satisfy a relationship $Hc1' \geqq Hc2'$ and $Hc3' \leqq Hc2'$, where $Hc3'$ denotes a dynamic coercivity of the first ferromagnetic layer, $Hc1'$ denotes a dynamic coercivity of the second ferromagnetic layer, and $Hc2'$ denotes a dynamic coercivity of the magnetic layer,
each of the dynamic coercivities $Hc1'$, $Hc2'$ and $Hc3'$ referring to a coercivity for a case where a time required to switch a direction of an external magnetic field is on the order of sub-nano second to approximately one nano-second order,
each of said first and second ferromagnetic layers and said magnetic layer is made of a material selected from a group consisting of CoCrPt and CoCrPt-M alloy, where M is an element or alloy thereof selected from a group consisting of B, Mo, Nb, Ta, W and Cu, and
a Pt content of the first ferromagnetic layer is smaller than a Pt content of the magnetic layer by at least 7 atomic %.

* * * * *

UNITED STATES PATENT AND TRADEMARK OFFICE
CERTIFICATE OF CORRECTION

PATENT NO.         : 7,435,489 B2
APPLICATION NO. : 10/798102
DATED              : October 14, 2008
INVENTOR(S)        : Hisashi Umeda It is certified that error appears in the above-identified patent and that said Letters Patent is hereby corrected as shown below:

In the Claims:

Col. 26, line 24, delete "$Hc \leq Hc2$" and insert -- $Hc3' \leq Hc2'$ --.

Signed and Sealed this

Twenty-fourth Day of March, 2009

JOHN DOLL
*Acting Director of the United States Patent and Trademark Office*